(12) United States Patent
Kashima

(10) Patent No.: US 6,891,584 B1
(45) Date of Patent: May 10, 2005

(54) LIQUID-CRYSTAL DISPLAY

(75) Inventor: Keiji Kashima, Shinjuku-ku (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 09/582,026

(22) PCT Filed: Sep. 10, 1999

(86) PCT No.: PCT/JP99/04912
§ 371 (c)(1),
(2), (4) Date: Jun. 21, 2000

(87) PCT Pub. No.: WO00/25176
PCT Pub. Date: May 4, 2000

(30) Foreign Application Priority Data

| Oct. 28, 1998 | (JP) | 10-306468 |
| Oct. 29, 1998 | (JP) | 10-308200 |
| Oct. 30, 1998 | (JP) | 10-311141 |
| Nov. 4, 1998 | (JP) | 10-313227 |

(51) Int. Cl.$^7$ .................................... G02F 1/1335
(52) U.S. Cl. .................................... 349/98; 349/97
(58) Field of Search .................. 349/96–98, 100

(56) References Cited

U.S. PATENT DOCUMENTS 5,515,186 A * 5/1996 Fergason et al. .......... 349/14
5,751,385 A * 5/1998 Heinze ...................... 349/61

FOREIGN PATENT DOCUMENTS

| JP | 50-117394 | 9/1975 |
| JP | A 1-270024 | 10/1989 |
| JP | A 2-308106 | 12/1990 |
| JP | A 3-75705 | 3/1991 |
| JP | U-4-13924 | 2/1992 |
| JP | 4-502524 | 5/1992 |
| JP | A 4-502524 | 5/1992 |
| JP | A 5-273546 | 10/1993 |
| JP | 6-130424 | 5/1994 |
| JP | A 6-230371 | 8/1994 |
| JP | A 7-84250 | 3/1995 |
| JP | A 8-146416 | 6/1996 |
| JP | A-8-220521 | 8/1996 |
| JP | 8-234143 | 9/1996 |
| JP | 9-506985 | 7/1997 |
| JP | A 10-3078 | 1/1998 |
| JP | A-10-268283 | 10/1998 |
| WO | WO 97/01788 | 1/1997 |

* cited by examiner

Primary Examiner—Dung T. Nguyen
(74) Attorney, Agent, or Firm—Oliff & Berridge, PLC

(57) ABSTRACT

In a liquid-crystal display (10), unpolarized light from a light source (12) passes through a linear polarization separation layer (14) and strikes a liquid-crystal cell (16). The liquid-crystal cell (16), in response to an applied electrical field, changes the direction of a director, so as to change the direction of the electrical field oscillation vector of the incident linearly polarized light by substantially 0 to 90°, this light then striking a dichroic linear polarization layer (18) on the surface, whereby only a component coincident with the polarization transmission axis thereof is allowed to exit to the outside. The dichroic linear polarization layer (18) transmits 50% of this incident light, and absorbs the remaining 50%.

5 Claims, 29 Drawing Sheets

PRIOR ART

LIQUID-CRYSTAL DISPLAY

TECHNICAL FIELD

The present invention relates to a liquid-crystal display having a dichroic polarizing layer that passes a light component of one polarization and absorbs a light component of another polarization, a polarization separation layer that passes a light component of one polarization and reflects a light component of another polarization, and a liquid-crystal cell, the retardation value or liquid crystal directors of which change in response to an electrical field.

BACKGROUND ART

A liquid-crystal display modulates polarized light obtained by passing the light through a polarizer and, as shown in FIG. 31, in a typical liquid-crystal display 1 of the past, light exiting from a light source 2 is caused to strike a light-absorbing type of dichroic linear polarizer 3, the linearly polarized light obtained therefrom being made to strike a liquid-crystal cell 4.

In the liquid-crystal display 1, light that strikes the liquid-crystal cell 4 and passes therethrough as polarized light, is modulated by the action of a voltage applied to electrodes provided on the liquid-crystal cell 4, which generates an electrical field that changes the liquid crystal within the cell is changed, or exits from the liquid-crystal cell 4 unchanged if there is no electrical field, after which, by the action of an absorption type dichroic linear polarizer disposed outside the liquid-crystal cell 4, light of only a specific polarization direction is transmitted.

The absorption type dichroic linear polarizers 3 and 5 pass polarized light of a transmission axis direction, and absorb almost all light of a direction perpendicular to the transmission axis direction. Therefore, approximately 50% of the light (unpolarized light) exiting from the liquid-crystal display 2 is absorbed by the dichroic linear polarizer 3, so that there is an overall decrease in the efficiency of light usage in the liquid-crystal display 1, and to achieve a sufficient intensity at the liquid-crystal display screen, it becomes necessary to cause a large amount of light from the light source to strike the dichroic linear polarizer 3.

However, if the amount of exiting light from the light source 2 increases in this manner, there is not only an increase in electrical power consumption, but also an increase in the heat generated by the light source 2, thus leading to the problem of an adverse affect on the liquid-crystal cell 4.

In contrast to the above, as disclosed in PC (WO) 4-502524 and the Japanese Unexamined Patent Application publication 6-130424, there has been a proposal of a liquid-crystal display in which, non-polarized light from a light source is separated into right-rotational or left-rotational circularly polarized light, by means of transmission or reflection using a cholesteric liquid-crystal layer, circularly polarized transmitted light of one rotational direction being caused to strike a liquid-crystal cell, and circularly polarized reflected light of another rotational direction being reflected, so as to reverse its rotational direction and cause it to pass through a cholesteric liquid-crystal layer, thereby improving the efficiency of light usage.

As disclosed in PC (WO) 9-506985, there has been a proposal of a liquid-crystal display in which non-polarized light from a light source is separated into two linearly polarized lights by transmission or reflection using an extended multilayer film, one transmitted linearly polarized light being caused to strike a liquid-crystal cell, and the other, reflected linearly polarized light having a direction that is perpendicular to the aforementioned light having its polarization direction changed, and being guided back to the extended multilayer film, thereby improving the efficiency of light usage.

In the liquid-crystal displays disclosed in the PC (WO) 4-502524 and the Japanese Unexamined Patent Application publication 6-130424, when no electrical field is applied to it, liquid-crystal layer shifts the phase of light an amount of either π (λ/2) or π/2 (λ/4), and when an electrical field is applied the liquid-crystal layer does not shift the phase of the light, light exiting from this liquid-crystal layer striking a circular polarizer disposed outside, it being transmitted or reflected, in accordance with its degree of polarization.

In the liquid-crystal display disclosed in PC (WO) 9-506985, linearly polarized light of one direction that has passed through an extended multilayer film is caused to strike a liquid-crystal cell, although there is no disclosure with regard to the retardation of the liquid-crystal layer.

In the liquid-crystal displays disclosed in PC (WO) 4-502524 and Japanese Unexamined Patent Application publication 6-130424, for the following reason, there is an extreme worsening of readability in the liquid-crystal display, and a great loss of contrast, making the display quality insufficient.

Specifically, in the liquid-crystal display of PC (WO) 4-502524, because a circular polarizer disposed outside of the liquid-crystal layer and directly visible is made from a low pitch cholesteric applied film having spectrally selective reflectivity, approximately 50% of the external light striking this circular polarizer is reflected, so that this directly entering the eyes of an observer, thereby causing a severe worsening of readability.

In the same manner, in the liquid-crystal display of Japanese Unexamined Patent Application publication 6-130424, the color-selective layer that is directly observable from the outside is a circular polarizer made of a cholesteric liquid crystal, and this, similar to the case cited above, directly reflects approximately 50% of the incident external light, thereby greatly reducing the readability of the display.

DISCLOSURE OF INVENTION

Accordingly, the present invention was made with the above-described problems of the past in mind, and has as an object to provide a liquid-crystal display having a simple configuration, which has no loss of readability or great decrease in contrast caused by external light, and in particular in the case of a transmissive type liquid-crystal display, can provide a great improvement in the efficiency of light usage, and in the case of a reflective type liquid-crystal display can provide both high contrast and color display, making use of the birefringence in the liquid crystal.

A first aspect of the present invention is to provide a liquid-crystal display, as described in claim 1, comprising a dichroic polarizing layer having one of a function whereby of the incident light, a light component having circular polarization of one direction, either right or left, is transmitted, and a component of the other circularly polarization direction is reflected, and a function whereby one linearly polarized light component is transmitted and a linearly polarized light component perpendicular thereto is absorbed, a liquid-crystal cell including a liquid-crystal layer that shifts the phase of light passing therethrough and electrodes for applying an electrical field to the liquid-crystal layer, whereby one of circularly polarized light and linearly polarized light incident after being transmitted through the dichroic polarizing layer is converted to the other before it exits the other side or is not converted but the liquid-crystal cell also has one function of a function that changes the ellipticity of the light if exiting as circularly polarized light or changes the direction of polarization of the light it if it is exiting as linearly polarized light, and a polarization separation layer having one of a function of transmitting a light component having circular polarization of one direction, either right or left, and reflecting a component of the other circular polarization direction, and a function of transmitting one linearly polarized light component and reflecting another component having a polarization direction perpendicular thereto, these being disposed in this sequence as seen from the observation side, wherein light is caused to be incident from either the dichroic polarizing layer or the polarization separation layer side.

In the above-noted liquid-crystal display, the dichroic polarizing layer can be a dichroic circular polarizing layer which, of incident light transmits a circularly polarized light component of one direction, either right or left, and absorbs a circularly polarized light component of the other direction, said liquid-crystal layer having a retardation value that causes a phase shift in the transmitted light that is substantially $\pi/2$, the liquid-crystal cell converting the incident circularly polarized light to linearly polarized light before it exits from the opposite side by applying an electrical field from said electrodes to the liquid-crystal layer so as to change the orientation of the directors thereof, thereby causing a change in the polarization axis of the linearly polarized light, the polarization separation layer being made a linear polarization separation layer that, of the incident light thereto, transmits a light component of one linear polarization and reflects another linearly polarized light component having polarization perpendicular thereto.

In the above-noted liquid-crystal display, a circuit can be provided for control of a voltage between the electrodes, so that the direction of the directors of the liquid crystal in the liquid-crystal cell is changed by substantially −45 to +45 degrees with respect to the electrical vector direction of the incident linearly polarized light.

In the above-noted liquid-crystal display, the dichroic polarizing layer can be a dichroic circular polarizing layer which, of incident light transmits a circularly polarized light component of one direction, either right or left, and absorbs a circularly polarized light component of the other direction, the liquid-crystal cell having the effect of shifting the circularly polarized light phase of incident light substantially by 0 to $\pi$, when said electrical field is applied to said liquid-crystal layer from the electrodes so as to change the retardation value thereof, the polarization separation layer being made a circular polarization separation layer that, of the incident light thereto, transmits a light component of one circular polarization, either right or left, and reflects another circularly polarized light component having the opposite polarization.

In the above-noted liquid-crystal display, the dichroic polarizing layer can be made a dichroic circular polarizing layer which, of incident light transmits one circularly polarized light component and absorbs another circularly polarized light component, said liquid-crystal cell having the effect of shifting a linealy polarized light phase of incident light substantially by −$\pi/2$ to $\pi/2$, when said electrical field is applied to said liquid-crystal layer from said electrodes so as to change the retardation value thereof, and the polarization separation layer being a linear polarization separation layer that, of the incident light thereto, transmits a light component of one linear polarization and reflects another linearly polarized light component having polarization perpendicular thereto.

In the above-noted liquid-crystal display, the dichroic polarizing layer can be a dichroic linear polarizing layer which, of incident light transmits one linearly polarized light component and absorbs a linearly polarized light component perpendicular thereto, the liquid-crystal layer having a retardation value that causes a phase shift in transmitted light of substantially $\pi/2$, the liquid-crystal cell converting incident linearly polarized light to circularly polarized light before it exits from the opposite side, the director direction of the liquid crystal being changed by applying the electrical field to the liquid crystal from the electrodes, thereby changing the ellipticity of the circularly polarized light, and the polarization separation layer being made a circular polarization separation layer that, of the incident light thereto, transmits a light component of one circular polarization, either right or left, and reflects another circularly polarized light component having the opposite polarization.

In the above-noted liquid-crystal display, a circuit can be provided for control of a voltage between the electrodes, so that the direction of the directors of the liquid crystal in the liquid-crystal cell is changed by substantially −45 to +45 degrees with respect to the light transmission axis of the dichroic linear polarizing layer.

In the above-noted liquid-crystal display, the dichroic polarizing layer can be a dichroic linear polarizing layer which, of incident light transmits one linearly polarized light component and absorbs a linearly polarized light component perpendicular thereto, the liquid-crystal cell being such that, with the electrical field applied to the liquid-crystal layer from the electrodes, the retardation value of the liquid crystal is change so as to shift the phase of the incident linearly polarized light substantially from 0 to $\pi$, and the polarization separation layer being a linear polarization separation layer that, of the incident light thereto, transmits a light component of one linear polarization and reflects another linearly polarized light component having polarization perpendicular thereto.

In the above-noted liquid-crystal display, the dichroic polarizing layer can be a dichroic linear polarizing layer which, of incident light transmits one linearly polarized light component and absorbs a linearly polarized light component perpendicular thereto, the liquid-crystal cell being such that, with the electrical field applied to the liquid-crystal layer from the electrodes, the retardation value of the liquid crystal is changed so as to shift the phase of the incident light substantially −$\pi/2$ to +$\pi/2$, and the polarization separation layer being a circular polarization separation layer transmitting one circularly polarized light component of the incident light and reflecting the other circularly polarized light component of the incident light.

In the above-noted liquid-crystal display, the liquid-crystal cell is held between two substrates the electrodes being disposed on the two substrates, with the liquid crystal therebetween. When voltage is applied to the electrodes, the mode is enabled in which angle of the liquid crystal molecules with respect to the substrate surfaces changes, thereby changing the retardation value of the liquid crystal.

In the above-noted liquid-crystal display, the dichroic polarizing layer can be a dichroic linear polarizing layer which, of incident light transmits one linearly polarized light component and absorbs a linearly polarized light component perpendicular thereto, the liquid-crystal cell including a liquid-crystal layer having a retardation value that shifts the phase of transmitted light substantially π, and applying the electrical field to the liquid-crystal layer from the electrodes so as to change the orientation of the directors thereof, thereby causing a change in the polarization axis of the linearly polarized light to the opposite direction which perpendicular to the original light, and the polarization separation layer being made a linear polarization separation layer that, of the linearly polarized light incident thereto, transmits a light component of one linear polarization and reflects another linearly polarized light component having polarization perpendicular thereto.

In the above-noted liquid-crystal display, a circuit can be provided for control of a voltage between the electrodes, so that the direction of the directors of the liquid crystal in the liquid-crystal cell is changed by substantially 0 to +45 degrees.

In the above-noted liquid-crystal display, the liquid-crystal layer of the liquid-crystal cell can be held between two substrates, the electrodes being formed on one substrate, wherein when a voltage is applied to the electrode, the resulting electrical field as a part that is substantially parallel to the substrate surface, the direction of the most of the liquid crystal molecules within the liquid-crystal layer being in a mode in which they remain substantially parallel to the substrate surface.

In the above-noted liquid-crystal display, the circular polarization separation layer can be made of a rotation-selective layer made of a cholesteric liquid crystal.

In the above-noted liquid-crystal display, the circular polarization separation layer can be made of a laminate of a phase-shifting layer having a retardation value that shifts the phase of a transmitted light by substantially π/2 and three or more films having birefringence, this being a planar multilayer structure wherein of two lights having oscillation directions mutual perpendicular within the plane of each layer, the difference in index of refraction between layers adjacent in the thickness direction with respect to one light is different from the difference in the index of refraction between adjacent layers in the thickness direction for the other light, linearly polarized light transmitted through or reflected by this planar multilayer structure being converted to circularly polarized light.

In the above-noted liquid-crystal display, the linear polarization separation layer can be a planar multilayer structure of three or more films having birefringence, wherein of two lights having oscillation directions mutually perpendicular within the plane of each layer, the difference in index of refraction between layers adjacent in the thickness direction with respect to one light is different from the difference in index of refraction between layers adjacent in the thickness direction with respect to the other light.

In the above-noted liquid-crystal display, the linear polarization separation layer can be made up of a phase-shifting layer having a retardation value that shifts the phase of transmitted light by substantially π/2, and a rotation-selective layer made of a cholesteric liquid-crystal layer, wherein circularly polarized light transmitted through or reflected by the cholesteric layer is converted to linearly polarized light.

In the above-noted liquid-crystal display, an auxiliary dichroic linear polarizing layer can be provided between the liquid-crystal cell and the linear polarization separation layer, whereby, of the incident light, one linearly polarized light component is transmitted, and another linearly polarized light component perpendicular thereto is absorbed.

In the above-noted liquid-crystal display, an auxiliary dichroic circular polarizing layer can be provided between the liquid-crystal cell and the circular polarization separation layer, whereby, of the incident light, one circularly polarized light component of either right or left rotation is transmitted, and another circularly polarized light component of the opposite direction is absorbed.

In the above-noted liquid-crystal display, a light source can be disposed on the side of the polarization separation layer opposite from the liquid-crystal cell, light from the light source passing through the polarization separation layer and striking the liquid-crystal cell.

In the above-noted liquid-crystal display, a light-absorbing layer can be disposed on the side of the polarization separation layer opposite from the liquid-crystal cell, whereby light having passed through the polarization separation layer is absorbed.

In the present invention, in addition to using a light-absorbing dichroic polarizer on the externally viewable surface, the retardation value or liquid crystal director is selected, in accordance with this dichroic polarizer, thereby eliminating a reduction in light utilization efficiency and preventing a loss of display contrast and worsening of readability caused by external light, while using birefringence of the liquid-crystal layer to achieve a color liquid-crystal display with good contrast.

BEST MODE FOR CARRYING OUT THE INVENTION

Preferred embodiments of the present invention are described in detail below, with references being made to relevant accompanying drawings.

Figure 1:
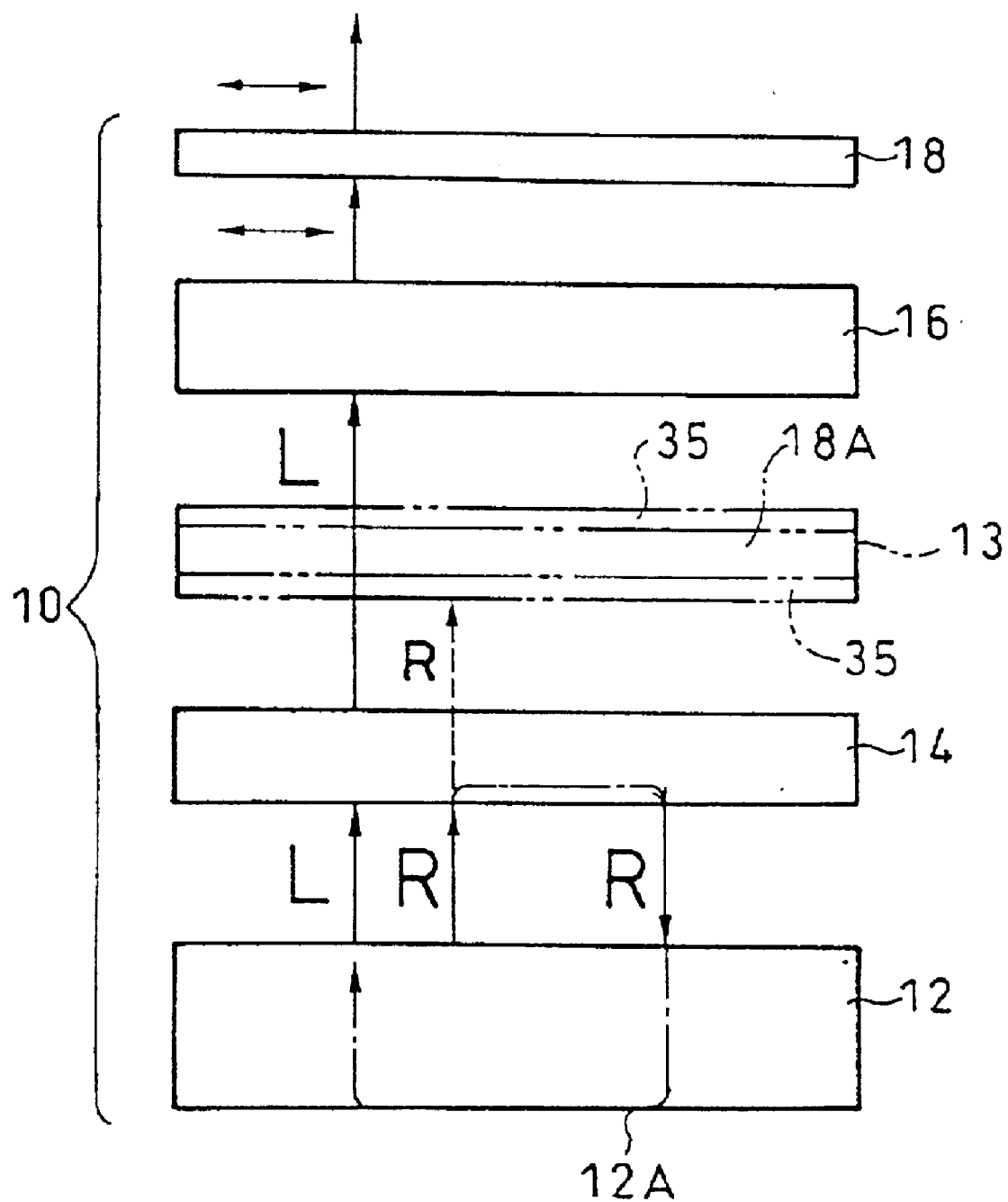
FIG. 1 is a simplified cross-section view showing an exploded view of a liquid-crystal display according to a first embodiment of the present invention.

As shown in FIG. 1, a liquid-crystal display 10 according to the first embodiment of the present invention includes a light source 12 that emits non-polarized light, a circular polarization separation layer 14, which, of light emitted form the light source, transmits one (elliptical) circularly polarized light, a liquid-crystal cell 16, a light-absorption type dichroic linear polarizing layer 18 disposed on the side of the liquid-crystal cell 16 opposite from the circular polarization separation layer 14, which receives linearly polarized light transmitted through the liquid-crystal cell 16, pixel electrodes 24A and 24B, which apply an electrical field to the liquid-crystal layer 22, wherein circularly polarized light passing through the circular polarization separation layer 14 is converted to linearly polarized light before it exits from the opposite direction from the circular polarization separation layer 14, this linearly polarized light passing through the liquid-crystal cell 16 being received by the light-absorption type dichroic linear polarizing layer 18 and further wherein an electrical field is applied to the liquid-crystal layer 22 from the pixel electrodes 24A and 24B, thereby changing the direction of the directors of the liquid crystal, which changes the polarization axis of the linearly polarized light.

In FIG. 1, the symbols "⇆" and "•" indicate electrical field oscillation vectors of linearly polarized light, "⇆" being directions within the plane of the drawing and "•" being a direction perpendicular to the plane of the drawing.

A reflective layer 12A is formed on the rear surface (lower surface as shown in FIG. 1) of the light source 12. The reflective layer 12A reflects light that has exited the light source 12 and been reflected to the circular polarization separation layer 14 back in the direction of the circular polarization separation layer 14, whereupon the phase of the circularly polarized light component is reversed, or the light is made non-polarized light, so that it can pass through the circular polarization separation layer 14.

The circular polarization separation layer 14 is made of, for example a cholesteric liquid-crystal layer, and the light-absorption type dichroic linear polarizing layer 18 passes polarized light of the transmission axis direction and absorbs almost all polarized light of a direction perpendicular to the transmission axis, this being formed either by immersing a PVA (polyvinyl alcohol) film in an aqueous solution of potassium iodide, and then extending the PVA film in one direction in a boric acid solution, so as to laminate a protective film in which iodine atoms absorbed by the PVA film are oriented in one direction, an a so-called iodine-based polarizer, or by a dye-based dichroic polarizer, or the like.

The liquid crystal in the liquid-crystal layer 16 is adjusted so that its retardation value causes a shift of substantially $\pi/2$ in the phase of transmitted light, regardless of whether an electrical field is applied.

The adjustment can be done by a known liquid crystal (for example, a nematic liquid crystal) by control of the birefringence and thickness of the liquid-crystal layer.

Figure 2:
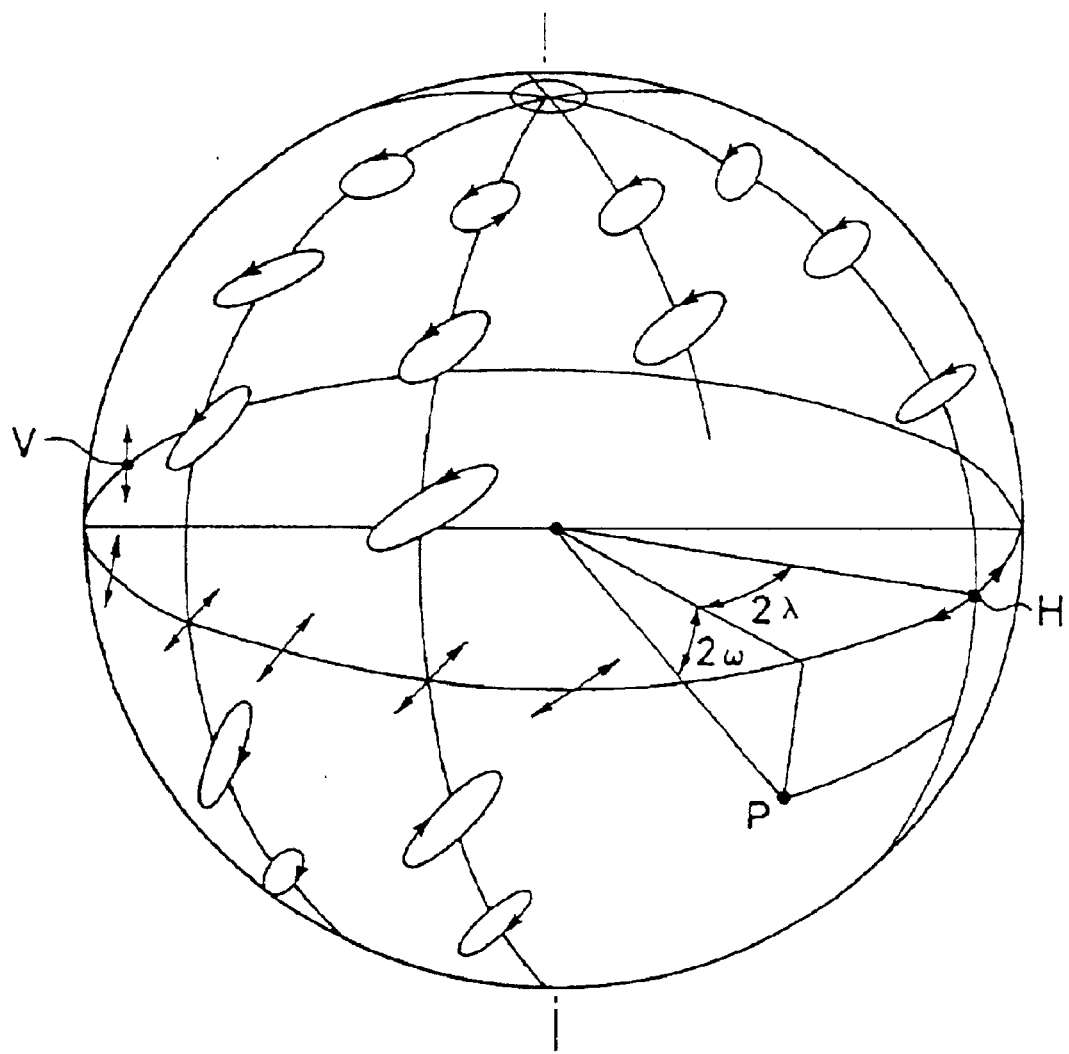
FIG. 2 is a graph of a Poincare sphere illustrating various polarization relationships.

The Poincare sphere shown in FIG. 2 is used in describing polarization, and in investigating how the form of the polarization changes when the phase is changed. In FIG. 2, the poles at the top and bottom of the sphere represent left and right circular polarizations, respectively, and a point on the equator represents linear polarization, with other points representing elliptically polarized light.

An arbitrary point H on the equator represents horizontal polarization, and a point V on other end of a diameter that passes through the point H represents vertical polarization. The diameter of the sphere is generally taken to be 1, and can alternately be proportional to the intensity of light.

An arbitrary point P on the surface of a unit radius Poincare sphere is represented by a longitude $2\lambda$ and a latitude $2\omega$, in which case $\lambda$ and $\omega$ satisfy the conditions $-180°<2\lambda<180°$ and $-90°<2\omega<90°$, respectively.

The longitude is taken as being positive when measured in the clockwise direction from point H, and the latitude is taken as being positive when measured upward from the equator, that is, toward the pole representing right circular polarization. The coordinates of the point P in FIG. 2, therefore, are positive.

The arbitrary point P represents total elliptical polarization, with a direction angle of λ and a ellipticity ratio of tan |ω|. The rotation to the left or right depends upon whether the point P is in the upper or lower hemisphere. Summarizing these conventions, for the cross-section view of elliptical polarization represented by the point P, the following relationships (1) and (2) obtain.

$$\alpha = \lambda \quad (1)$$

$$b/a = \tan|\omega| \quad (2)$$

Figure 3:
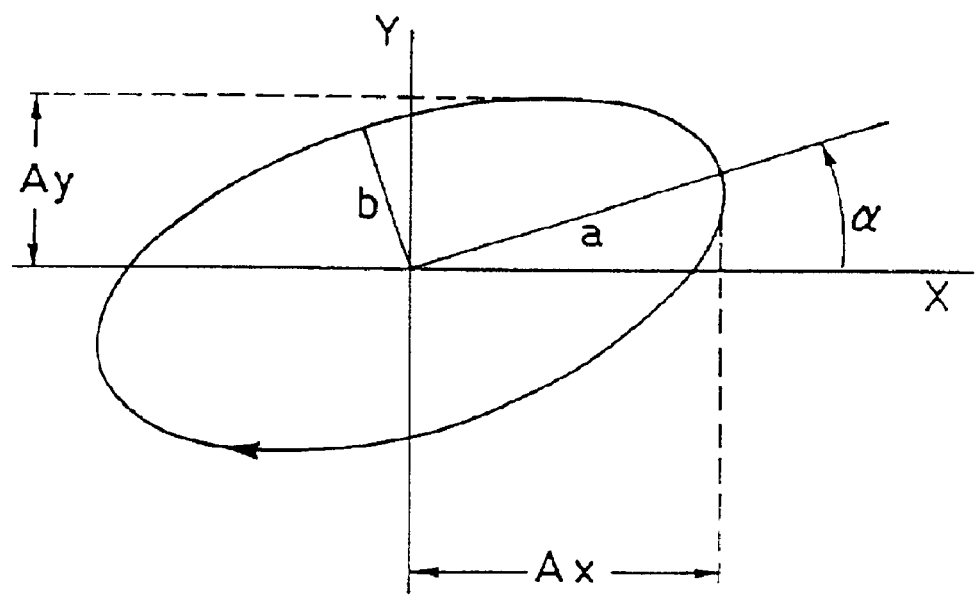
FIG. 3 is a graph showing the symbols used to describe elliptically polarized light and a cross-section of elliptically polarized light.

The cross-section of monochroic light is generally an ellipse, and the ellipse can be represented by the symbols shown in FIG. 3. The angle α formed between the half major axis and the X axis is called the direction angle of the cross-sectional view, which satisfies the relationship $0° \geq \alpha \leq -90°$. If the ellipticity is the ratio b/a of the two half axes and $\tan^{-1} b/a = \beta$, then $90° \geq \beta \geq -90°$.

The orientation of polarized light is right-rotational if 2ω is positive and left-rotational if 2ω is negative. From the above, each point in the Poincare sphere represents light of a different form of polarization. That is, one form of polarized light can be represented by one point on the Poincare sphere.

Therefore, if left-rotational totally circularly polarized light at the upper pole of the Poincare sphere is shifted in the positive direction by π/2 with a direction angle of λ=0, the point H on the equator of the Poincare sphere will be reached. That is, by shifting circularly polarized light by π/2, its is changed to horizontal linearly polarized light. In the same manner, shifting positively by π will reach the lower pole, which represents right-rotational totally circularly polarized light.

If right-rotational totally circularly polarized light at the lower pole of the Poincare sphere is shifted by π/2 at a direction angle of λ=0, point V on the equator will be reached, this representing vertical linearly polarized light, and shifting by π will result in left-rotational totally circularly polarized light at the upper pole. If the shift amount is neither π/2 nor π, elliptical polarization results.

The liquid-crystal cell 16 is described below in further detail, with reference made to FIG. 4 and FIG. 5.

Figure 4:
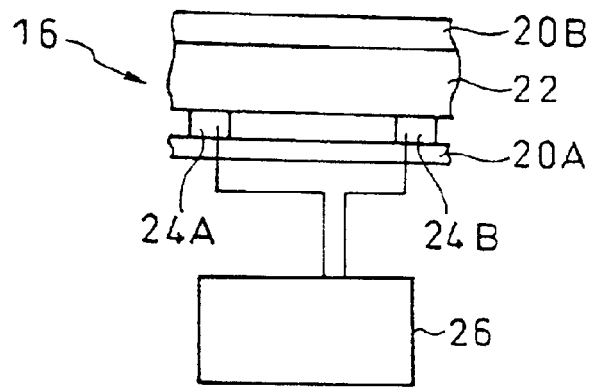
FIG. 4 is a cross-section view showing an enlarge view of a liquid-crystal cell in the above-noted liquid-crystal display.

The liquid-crystal cell 16, as shown in FIG. 4 is made up of a liquid-crystal layer 22 sandwiched between two substrates 20A and 20B, and pixel electrodes 24A and 24B disposed on the upper surface of the substrate 20A as shown in FIG. 4, these being separated from one another in the horizontal direction. The direction of the electrical field occurring when a voltage from circuit 26 is applied between the pixel electrodes 24A and 24B is substantially parallel to the substrate surface, so that the mode is enabled in which the direction of the directors D of a larger part of the liquid crystal molecules in the liquid-crystal layer 22 rotate while remaining substantially parallel to the substrate surface, this being known as the IPS (in-plane switching) mode.

The direction of the liquid crystal directors D in the liquid-crystal layer 22 can be further described as follows. As shown in FIG. 5, in the condition in which an electrical field is not applied between pixel electrodes 24A and 24B, the direction of the directors D is substantially perpendicular to the plane of the drawing and, as shown in FIG. 6, in the condition in which an insulation film is applied between the pixel electrodes 24A and 24B, the directors D of the liquid crystal move toward the direction which is substantially parallel to the drawing plane.

Figure 5:
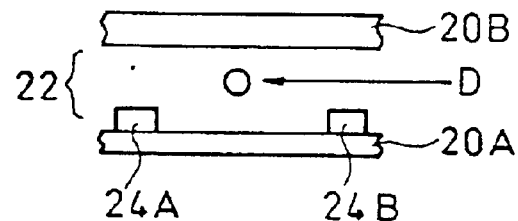
FIG. 5 is an enlarged cross-section view showing the director directions of a liquid crystal in the above-noted liquid-crystal cell.
Figure 6:
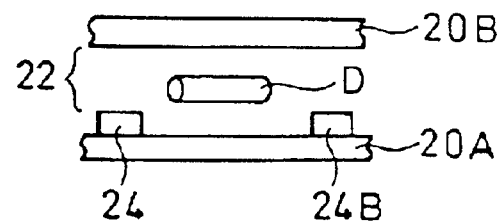
FIG. 6 is an enlarged cross-section view showing the director directions of a liquid crystal in the above-noted liquid-crystal cell when an electrical field is applied.

The dielectric constant anisotropy Δ∈ of the liquid crystal in FIG. 5 is shown as positive, in which case if an electrical field is not applied between pixel electrodes 24A and 24B, the direction of the directors D of the liquid crystal are substantially parallel to the drawing plane, while if an electrical field is applied between the pixel electrodes 24A and 24B, the directors D of the liquid crystal move towards a direction that is substantially perpendicular to the drawing plane.

The change of the directors D of the liquid crystal in the example of FIG. 1 is one in which, when the polarization condition of the circularly polarized light incident to the liquid-crystal cell 16 is shifted to linearly polarized light, the direction of the polarization axis of the linearly polarized light is changed, this being the direction angle λ, that is, the longitudinal direction on the Poincare sphere of FIG. 2.

Therefore, for example, horizontal linearly polarized light represented by point H on the equator of the Poincare sphere, by changing the directors D of the liquid crystal, is changed to a polarization axis direction represented by a point that is shifted along the equator.

For circularly polarized light, a change in the directors D of the liquid crystal changes the direction of the polarization axis. For example, left-rotational circularly polarized light represented by the upper pole point on the Poincare sphere, by a change in the directors D of the liquid crystal, experiences a change in the direction angle λ, and is represented by a point on the equator shifted in the latitudinal direction.

The liquid-crystal layer 22 is adjusted so as to have a retardation value that shifts the phase of transmitted light by substantially π/2, and the retardation value is substantially the same, regardless of whether or not an electrical field is applied between the pixel electrodes 24A and 24B. This adjustment can be performed, for example, by a known liquid crystal, for example a nematic (Nn) liquid crystal, by control of the birefringence and thickness of the liquid-crystal layer. The director D are substantially parallel to the substrates 20A and 20B.

The above-noted expressions "(shifted) substantially π/2" and "substantially parallel to the substrates 20A and 20B" include the cases in which there is a slight shift from the ideal condition, because of a pre-tilt angle in the liquid crystal or various external disturbances.

As noted above, the circular polarization separation layer 14 is made, for example, of a cholesteric liquid-crystal layer. This cholesteric liquid-crystal layer exhibits, by virtue of physical molecular orientation, rotation selectivity which separates a light component of one rotational direction from a light component of the opposite rotational direction, light that is incident to the helical axis of a planar arrangement being separated into right-rotational and left-rotational circularly polarized lights, one being transmitted, and the other being reflected.

This phenomenon is known as circular polarization dichroicity, and if the rotation direction with respect to the incident light is selected appropriately, circularly polarized light having a rotational direction the same as the helical axis direction of the cholesteric liquid crystal is selectively scattered and reflected.

The maximum rotated light scattering in this case occurs at a wavelength of λ0 given by Equation (3).

$$\lambda 0 = nav \cdot p \quad (3)$$

In the above, p is the helical pitch, and nav is the average index of refraction within a plane perpendicular to the helical axis.

Under these conditions, the wavelength bandwidth Δλ of the reflected light is given by Equation (4).

$$\Delta\lambda = \Delta n \cdot p \quad (4)$$

In the above, Δn=n (∥)−n (right angle), where n(∥) is the maximum index of refraction in a plane perpendicular to the helical axis, and n (right angle) is the maximum index of refraction in a plane parallel to the helical axis.

Methods of achieving a wide wavelength bandwidth Δλ include a method of changing the helical pitch (for example, in U.S. Pat. No. 5,691,789) and a method of superposing a number of cholesteric liquid-crystal layers having different pitches (in Japanese Unexamined Patent Application publication H9-304770).

It is known that that wavelength λφ of selectively scattered light of light incident at an inclination to the helical axis of a planar arrangement is shifted toward the short wavelength in comparison with λ0.

As a cholesteric liquid crystal material, it is desirable to use a chiral nematic liquid crystal with a Shiff's base, an azo compound, an ester, or a biphenyl nematic liquid crystal compound, with an optically activated 2-methyl butyl group, a 2-methyl butoxy group, a 4-methyl hexyl group joined to an end group thereof, or a chiral reactive liquid crystal compound.

Whereas a general high-polymer liquid crystal is a high polymer in which a mesogen group is introduced in the main chain, the side chain, or the main and side chain positions, a high-polymer cholesteric liquid crystal is obtained by introducing a cholesteryl group, for example, into the side chain.

The polarization separation action of a cholesteric liquid crystal is one whereby one circularly polarized light component, either right- or left-rotational, is transmitted, the other component being reflected. Upon reflection, the right or left circularly polarized light is reflected as is as right or left circularly polarized light.

The light source 12 is a white transparent thin-film planar light source, such as a thin-film electroluminescent source sandwiched between transparent resin sheets having electrodes, for example, and as noted above a reflective layer 12A made of, for example, a metal thin film is provided on the rear surface thereof.

In a liquid-crystal display 10 such as described above, of non-polarized light emitted from the light source 12, a circularly polarized light component of one rotational direction only is transmitted through the circular polarization separation layer 14, thereby reaching the liquid-crystal cell 16.

For example, of the setting is made such that, as in FIG. 1, only left-rotational circularly polarized light is transmitted, the right-rotational circularly polarized light is reflected at the circular polarization separation layer 14, the phase being reversed when it is reflected at the reflective layer 12A of the light source 12, or the light being scattered within the light source (by, for example, a light-scattering function thereof), thereby becoming left-rotational circularly polarized light that is transmitted through the circular polarization separation layer 14, and that strikes the liquid-crystal cell 16.

Left-rotational circularly polarized light transmitted through the liquid-crystal cell 16 is shifted by π/2 when passing therethrough, regardless of whether or not an electrical field is applied. Therefore, circularly polarized light incident to the liquid-crystal cell 16 exits from the liquid-crystal cell 16 as linearly polarized light.

Described in terms of the Poincare sphere of FIG. 2, if a shift is made from the upper pole point of the Poincare sphere with a direction angle of λ=0, the result is that left-rotational circularly polarized light becomes horizontal linearly polarized light (point H), and if the shift is made with a direction angle of λ=90°, it becomes vertical linearly polarized light (point V).

Thus, by applying an electrical field to the liquid-crystal layer 22 in the liquid-crystal cell 16 from the pixel electrodes 24A and 24B, it is possible to maintain the retardation value while changing the direction and the directors D of the liquid crystal, so that the polarization axis of transmitted polarized light is caused to change.

On the Poincare sphere of FIG. 2, as a result of a phase shift of π/2, vertical linearly polarized light indicated by the point V on the equator is changes to linearly polarized light having an inclination indicated a point that is shift along the equator.

In the case of light incident to the liquid-crystal layer 22, it is desirable to provide a circuit 26 that controls the voltage between the electrodes so that the direction of the directors of the liquid crystal is changed substantially −45° to +45° with respect to the transmission axis of the dichroic linear polarization separation layer as a reference.

The dichroic linear polarization separation layer 18 is made of a dichroic polarizing material such as Polaroid [TM], which passes polarized light having the transmission axis direction and absorbs almost all light of a direction that is perpendicular to the transmission axis.

By causing the polarized light transmission axis of the dichroic linear polarization separation layer 18 so that it either coincides with or is perpendicular to the polarization axis of linearly polarized light exiting from the liquid-crystal cell 16, and using the circuit 26 to control the electrical field applied to the liquid-crystal layer 22, and particularly by controlling the electrical field so that the direction of the liquid crystal is controlled so that the direction is changed substantially from −45° to +45° with respect to the linearly polarized light transmission axis of the dichroic linear polarization separation layer 18 as a reference, it is possible to adjust the amount of light transmitting through the dichroic linear polarization separation layer 18 from the maximum amount to the minimum amount, thereby making it possible to achieve a good display function, such as a gray-scale display function.

This can be expressed by Equation (5).

$$I = I_o \sin^2 2\theta(V) \sin^2(\pi d \Delta n/\lambda) \quad (5).$$

In the above, θ (V) is the rotational angle of the liquid crystal molecules, I is the intensity of light transmitted through the dichroic linear polarization separation layer 18, $I_o$ is the intensity of incident light, θ is the angle formed between the liquid crystal long axis (light axis) and the incident polarization direction, Δn and n are the index of refraction of the liquid crystal and the cell thickness, respectively, and λ is the wavelength of the incident light.

Figure 7:
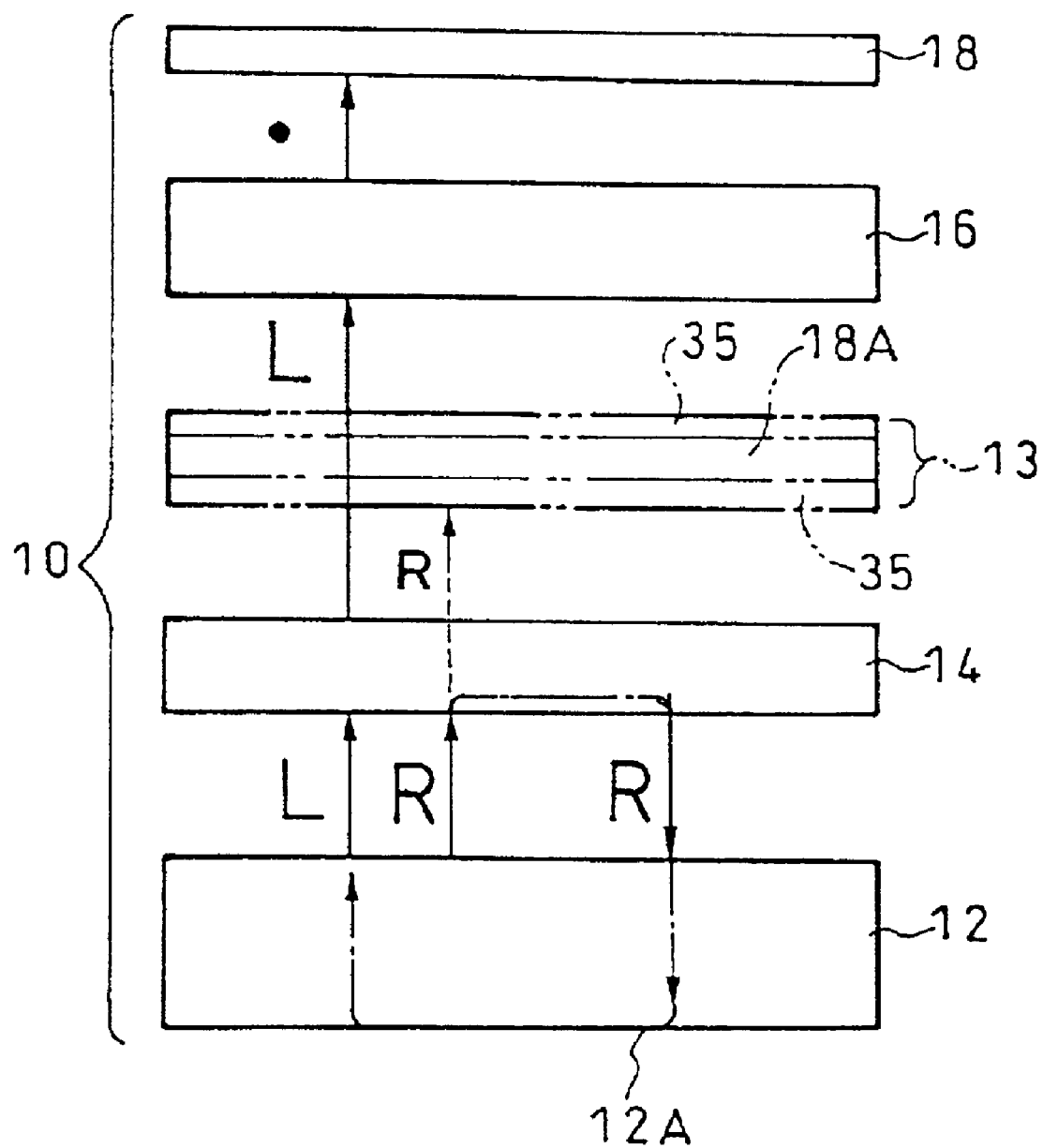
FIG. 7 is a cross-section view similar to FIG. 1, showing the dark condition of a display function of the above-noted liquid-crystal display.

Further, while FIG. 1 shows the so-called bright display condition, in which linearly polarized light exits from the dichroic linear polarization separation layer, as shown in FIG. 7 if the direction of the directors D of the liquid crystal in the liquid-crystal cell 16 is changed to a direction that is perpendicular to the direction at which the linearly polarized light exits from the liquid-crystal cell 16, the so-called dark display condition occurs.

Because the dichroic linear polarization layer 18, is made up of a light-absorbing type of dichroic polarizer, even if external light (non-polarized light) strikes the surface of the dichroic linear polarization layer 18, 50% thereof is absorbed, and the remaining 50% is transmitted, so that there is almost no reflected component, the result being that it is possible to greatly suppress the decrease in screen contrast in the liquid-crystal display 10.

In FIG. 1 and FIG. 7, as shown by the double-dot-dash line, it is further possible to provide an auxiliary dichroic circularly polarizing layer 13 between the circular polarization separation layer 14 and the liquid-crystal cell 16, so that right-rotational or left-rotational circularly polarized light that is transmitted through the circular polarization separation layer 14 is transmitted, and the other circularly polarized light component is absorbed.

The auxiliary circular polarization layer 13 is formed by a method of laminating a λ/4 phase-shifting layer (plate) 35 onto a dichroic linear polarizing layer 18A having the same configuration as the dichroic linear polarization layer 18, so that linearly polarized light is caused to be incident at an angle of 45° to the lead or lag axis within the plane of the λ/4 phase-shifting layer 35, onto the liquid-crystal cell 16 and linear polarization separation layer 14, so that, of the incident light, either right-rotational or left-rotational circularly polarized light is transmitted, with the other circularly polarized light component being almost entirely absorbed.

The λ/4 phase-shifting layer (plate) 35 can also be made of a liquid crystal material or an inorganic material, as long as it has effect of shifting the phase of light by λ/4, but it is preferable from the standpoint of good manufacturability, to use a high polymer resin extended film (extension ratio of approximately 1.3 to 1.4) PC, PVA, PS, PMMA, Norbornene resin or the like.

To achieve a wideband λ/4 phase-shifting plate that shifts the phase of light over the wavelength range of visible light, it is possible to cause dispose a λ/4 phase-shifting plate and a λ/2 phase-shifting plate so that the phase-lead axis and phase-lag axis thereof intersect at an angle of 60°±10°, with the λ/2 disposed on the polarizer side. When this is done, the relationship of the transmission axis of the polarizer with the lead axis or lag axis of the λ/2 phase-shifting plate is appropriately adjusted so that the circularly polarized light incident to the λ/4 phase-shifting plate is transmitted with maximum intensity, and that circularly polarized light of the opposite polarization direction is transmitted with the minimum intensity.

If the above is done, right-rotational or left-rotational circularly polarized light transmitted through the circular polarization separation layer 14 passes through the auxiliary dichroic circular polarization layer 13, whereupon the other circularly polarized light component that could not be reflected at the circular polarization separation layer 14 is absorbed by the auxiliary dichroic circular polarization layer 13, so that the other circularly polarized light component does not reach the liquid-crystal cell 16. Thus, an extremely high contrast condition is obtained.

For example, as shown in FIG. 1, if the setting is made so that only left-rotational circularly polarized light is transmitted, the right-rotational circularly polarized light is reflected at the circular polarization separation layer 14, and when it is reflected a the light source reflective layer 12A, the phase thereof is reversed, or the phase is scattered within the light source 12 (by, for example, a light-scattering function thereof), thereby being left-rotational circularly polarized light that is transmitted through the circular polarization separation layer 14 and that strikes the liquid-crystal cell 16.

Next a liquid-crystal display 30 according to a second embodiment of the present invention is described below, with reference being made to FIG. 8.

Figure 8:
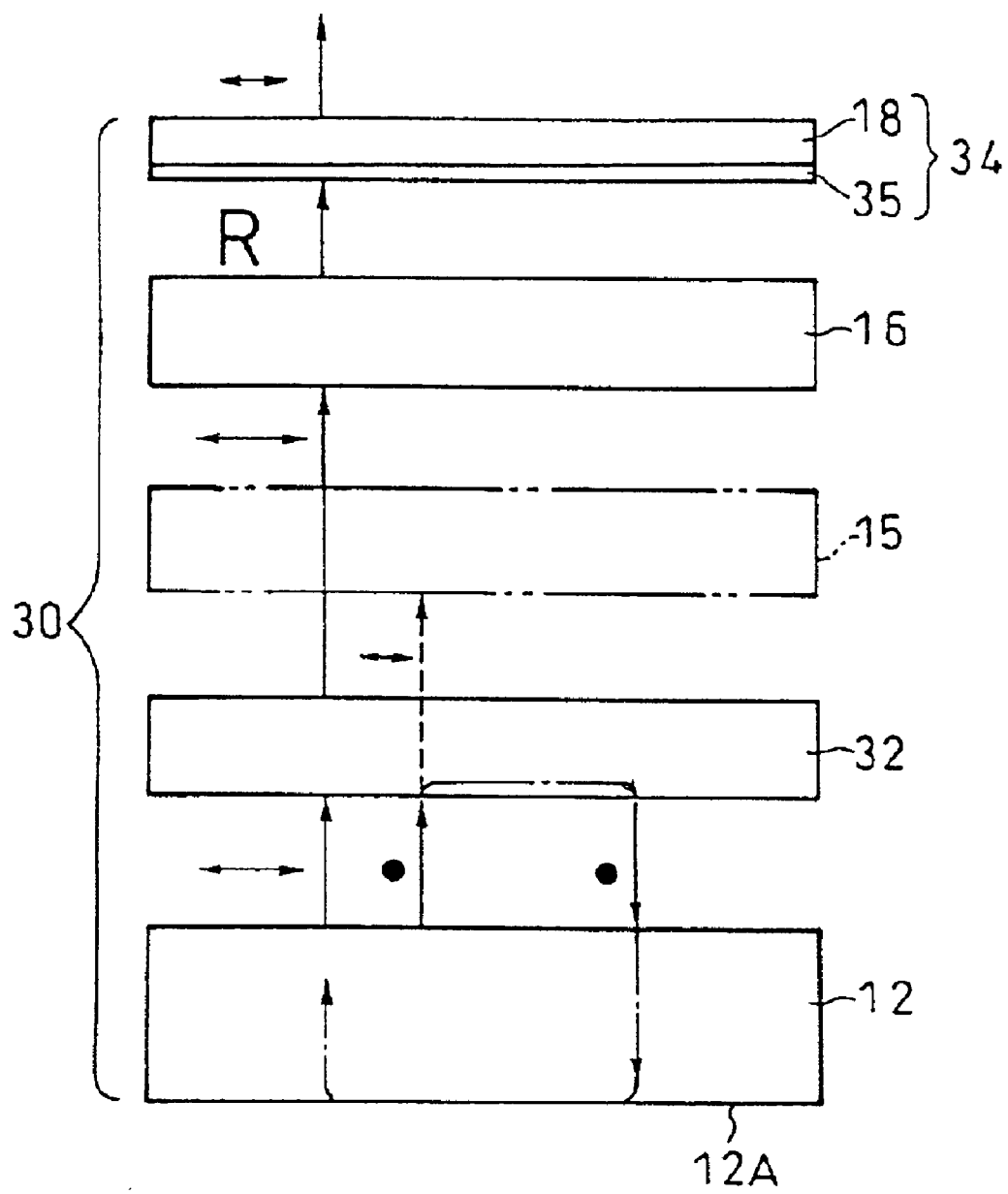
FIG. 8 is a simplified cross-section view showing an exploded view of the main part of a liquid-crystal display according to a second embodiment of the present invention.

In FIG. 8, elements having corresponding elements in the liquid-crystal display 10 of FIG. 1 are assigned the same reference numerals and will not be explicitly described herein.

The liquid-crystal display 30 is formed by a light source 12, a linear polarization separation layer 32 which, of light exiting from the light source 12, transmits one linearly polarized light and reflects another linearly polarized light component that is perpendicular thereto, a liquid-crystal cell 16, and a light-absorption type dichroic circular polarization layer 34 that receives light having been transmitted through the liquid-crystal cell 16.

The linear polarization separation layer 32 can be a planar multilayer structure of three or more films having birefringence, wherein of two lights having oscillation directions mutually perpendicular within the plane of each layer, the difference in index of refraction between layers adjacent in the thickness direction with respect to one light is different from the difference in index of refraction between layers adjacent in the thickness direction with respect to the other light.

A film having birefringence such as noted above is disclosed, for example, in the Japanese Unexamined Patent Application publication H3-75705 and in PCT (WO) H9-506837, can be obtained by extending a substance exhibiting intraplanar birefringence (index of refraction anisotropy), such as a polycarbonate resin, a polyester resin (for example, crystalline naphthalene dicarbonic acid polyester), a polyvinyl alcohol resin, or a acetic acid cellulose resin or the like.

For example, The index of refraction with respect to a light having oscillation in the X-axis direction of neighboring birefringent layers (films) is substantially the same $nx$, the difference in index of refraction $\Delta nx$ $(=|nx-nx|)$ between neighboring layers in the X-axis direction being substantially zero.

A In contrast to this, for example, if the indices of refraction with respect to light having oscillation in the Y-axis direction of the first and third films of a 3-layer birefringent film are both $ny_1$ and the index of refraction in the same direction in the second film is $ny_2(\neq ny_1)$, the index of refraction $\Delta ny$ between neighboring films in the Y-axis direction is not substantially zero.

The reflection of light oscillating in the direction in which the index of refraction difference is large (i.e., the Y-axis direction) is greater than the reflection of light oscillating in the direction in which the index of refraction difference is small (i.e., the X-axis direction), and the transmission of light in the X-axis direction is greater than transmission in the Y-axis direction.

For this reason, as seen from light oscillating in the X-axis direction, even if the linear polarization separation layer 32 has a planar multilayer structure, because the index of refraction in each layer is substantially same, there is only a slight surface reflection at two locations, the plane of incidence to the linear polarization separation layer 32 and the plane of exit therefrom.

In contrast to this, as seen from light oscillating in the Y-axis direction, because the index of refraction differs in each layer within the planar multilayer structure, in addition to the plane of incidence to and plane of exit from the linear polarization separation layer 32, reflection occurs as well at the surfaces (boundaries) between each of the layers, so that the greater the number of layers is, the more times light oscillating in the Y-axis direction is reflected.

The dichroic circular polarization layer 34 is formed by a method, for example, of laminating a λ/4 phase-shifting layer 35 to the dichroic linear polarization layer 18 on the side of the liquid-crystal cell 16.

In the liquid-crystal display 30, of the unpolarized light from the light source 12, one linearly polarized light component is transmitted at the linear polarization separation layer 32, and a linearly polarized light component perpendicular thereto is reflected.

The reflected linearly polarized light component is reflected either at the reflective layer 12A of the light source 12 or within the light source (by, for example, a light-scattering function thereof), so that the component transmitted through the linear polarization separation layer 32 is increased.

Linearly polarized light that strikes the linear polarization separation layer 32 is incident to the liquid-crystal layer 22, at which, in the case in which the direction of the electrical field vector of the linearly polarized light substantially forms an angle of 45° with the direction of the directors of the liquid-crystal layer (that is, the case in which the linearly polarized light is incident at an angle of 45° with respect to either the phase-lag axis direction or the phase-lead axis direction of the liquid-crystal layer), the phase thereof is shifted substantially π/2, so that the light becomes circularly polarized light.

Described in terms of the Poincare sphere of FIG. 2, for example, a vertical linearly polarized light perpendicular represented by the position of a point V on the equator is shifted by π/2 in the positive direction, thereby becoming left-rotational circularly polarized light, and horizontal linearly polarized light represented by a point H on the equator is shifted by π/2 in the positive direction, thereby becoming right-rotational circularly polarized light represented by the lower pole point of the Poincare sphere.

According to the electrical field applied to the liquid-crystal layer 22, linearly polarized light becomes, because of a change in the angle of incidence with respect to the phase-lag axis direction or phase-lead axis direction of the liquid-crystal layer, circularly polarized light with a modulated ellipticity. Describing this in terms of the Poincare sphere of FIG. 2, when linearly polarized light changes to circularly polarized light, there is modulation in the longitudinal direction on the Poincare sphere, with the ellipticity of the circularly polarized light changing.

For example, in the case in which the angle of incidence of linearly polarized light with respect to the phase-lag axis direction or the phase-lead axis direction of the liquid-crystal layer is zero, linearly polarized light incident to the liquid-crystal layer remains as linearly polarized light. However, in the case in which the angle of incidence of linearly polarized light with respect to the phase-lag axis direction or phase-lead axis direction is −45°, the linearly polarized light incident to the liquid-crystal layer becomes circularly polarized light with a rotation direction the opposite of the above-noted circularly polarized light.

That is, the circuit 26 is configured so that, in the case in which linearly polarized light strikes the liquid-crystal layer 22, it controls the voltage between the electrodes so as to vary the director direction of the liquid crystal substantially from −45° to +45°, with respect to the electrical field vector direction of the incident linearly polarized light as a reference.

Therefore, by controlling the voltage applied to the liquid-crystal layer 22 from the pixel electrodes 24A and 24B, it is possible to adjust the amount of light passing through the dichroic circular polarization layer 34, thereby enabling a gray-scale display. When this is done, circularly polarized light that is not transmitted through the dichroic circular polarization layer 34, for example, the left-rotational circularly polarized light in FIG. 8, is absorbed thereby.

If right-rotational circularly polarized light is transmitted through the dichroic circular polarization layer 34 from the bottom, it is first converted to linearly polarized light by the λ/4 phase-shifting layer 35, after which it passes through the dichroic linear polarization layer 18, and exits as horizontal linearly polarized light.

Figure 9:
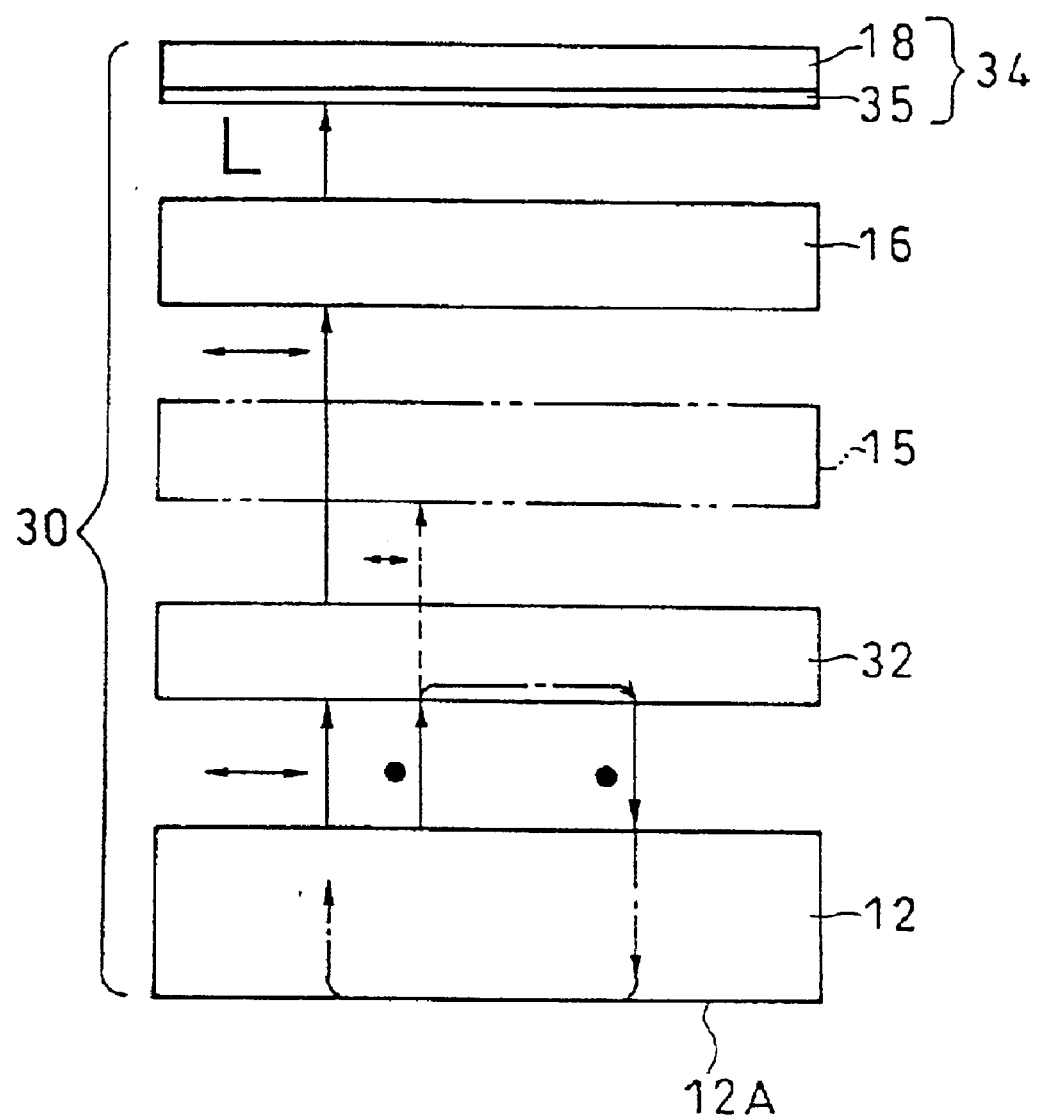
FIG. 9 is a cross-section view similar to FIG. 7, showing the dark condition of a display of the above-noted liquid-crystal display.

In the above-noted liquid-crystal display 30, in the case in which no electrical field is applied to the liquid-crystal layer 22 of the liquid-crystal cell 16, as shown in FIG. 9, linearly polarized light striking the liquid-crystal cell 16 is adjusted to left-rotational circularly polarized light, so that the so-called dark display condition occurs.

In this liquid-crystal display 30, even if unpolarized external light strikes the dichroic circular polarization layer 34, 50% thereof is absorbed, making it possible to suppress a loss of screen contrast caused by reflection.

It is possible, as shown by the two-dot-dash line in FIG. 8 and FIG. 9, to dispose a light-absorption type auxiliary dichroic linear polarization separation layer 15 between the linear polarization separation layer 32 and the liquid-crystal cell 16.

This auxiliary dichroic linear polarization layer 15 has the same configuration as the dichroic linear polarization layer 18, transmitting linearly polarized light that has passed through the linear polarization separation layer 32 and absorbing a linearly polarized light perpendicular thereto, which could not be reflected at the linear polarization separation layer 32.

By doing this, perpendicular linearly polarized light components that could not be reflected at the linear polarization separation layer 32 are absorbed by the auxiliary dichroic linear polarization layer 15, so that unnecessary polarized light components do not reach the liquid-crystal cell 16. Thus, it is possible to obtain a display condition with extremely good contrast.

While both the above-noted liquid-crystal displays 10 and 30 are transmissive type displays, it will be understood that the present invention is not restricted in this manner, and can be applied as well to a reflective type liquid-crystal display.

Figure 10:
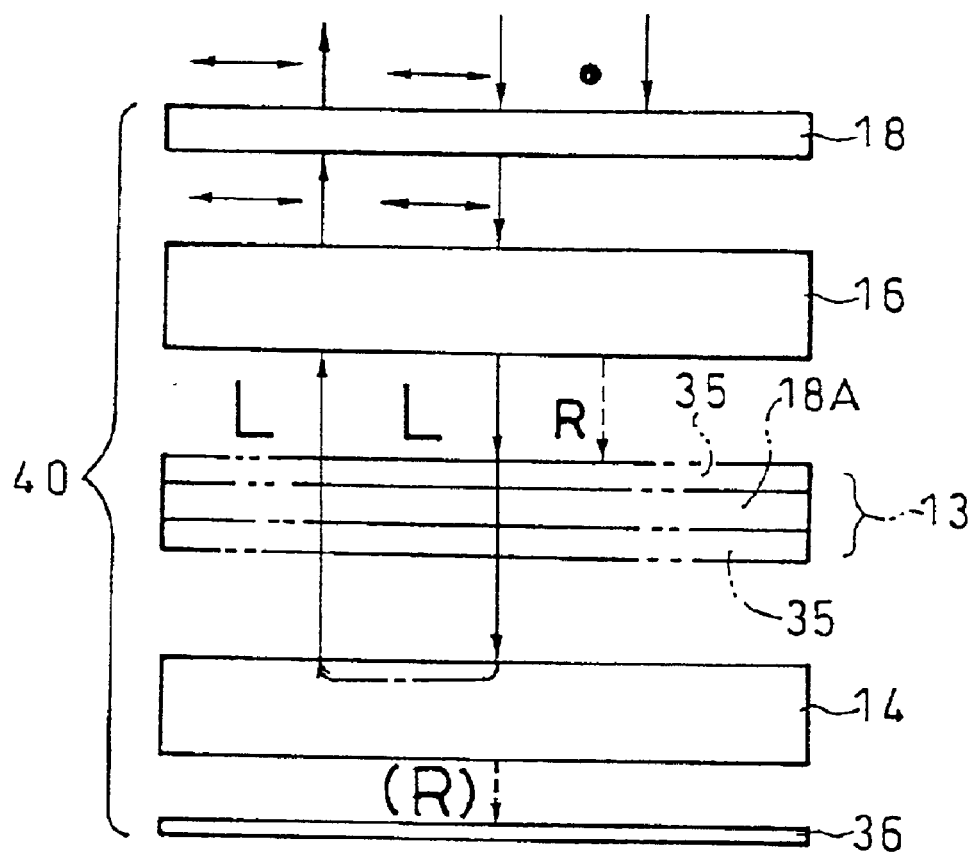
FIG. 10 is a simplified cross-section view showing an exploded view of the main part of a liquid-crystal display according to a third embodiment of the present invention.

The liquid-crystal display 40 of FIG. 10 is liquid-crystal display 10 of FIG. 1, except that this is made a reflective type display, wherein a light-absorbing layer 36 is provided in place of the light source 12 of FIG. 1.

Other aspects and elements of the configuration are the same as the liquid-crystal display 10 of FIG. 1, with corresponding elements assigned the same reference numerals, and not explicitly described herein. The auxiliary dichroic circular polarization layer 13 to be explained below is set so as to transmit left-rotational circularly polarized light, and the circular polarization separation layer 14 is set so as to reflect left-rotational circularly polarized light.

In this configuration, the light-absorbing layer 36 is, for example, a black paper, or a resin sheet, film, thin film, or the like, the surface of which has been roughened to prevent reflections.

In the above-noted reflective-type liquid-crystal display 40, of external light (unpolarized light), a linearly polarized light component of one direction, for example horizontal linearly polarized light, is transmitted through the dichroic linear polarization layer 18, and strikes the liquid-crystal cell 16.

Of the external light, a vertical linearly polarized light component that could not pass through the dichroic linear polarization layer 18 is absorbed thereby. Therefore, because reflection does not occur, it is possible to suppress the loss of contrast caused by reflections.

A linearly polarized light incident from the dichroic linear polarization layer 18 has its polarization axis modulated by the electrical field applied to the liquid-crystal cell 16. As described with regard to the liquid-crystal layer 22, this layer has a retardation value that causes a phase shift of substantially $\pi/2$ in the transmitted light, so that it has the effect of converting linearly polarized light by shifting it to circularly polarized light.

The rotational direction of this circularly polarized light is established by the above-described modulation of the polarization axis and when it strikes the circular polarization separation layer 14, reflection occurs if the rotational direction is left, but transmission occurs if the rotational direction is right.

Described in terms of the Poincare sphere of FIG. 2, horizontal linearly polarized incident light, by changing the liquid crystal director D from $-45°$ to $+45°$, is moved from the point H on the equator, the move being from the upper pole point to the point H in the case of $-45°$ to $0°$, so that left-rotational circularly polarized light becomes linearly polarized light, and the move being from the lower pole point to the point H in the case of 0 to $45°$, so that right-rotational circularly polarized light become linearly polarized light.

Left-rotational circularly polarized light L reflected by the circular polarization separation layer 14 returns to the liquid-crystal cell 16 from a direction that is the opposite of that noted above, and when this light passes through the liquid-crystal cell 16, in the same manner as in the liquid-crystal display 10 of FIG. 1, it exits as linearly polarized light, the polarization axis thereof being modulated by the direction of the directors D of the liquid crystal, and passes through the dichroic linear polarization layer 18 to become display light. Therefore, the amount of light reflected by the circular polarization separation layer 14 and passing through the liquid-crystal cell 16 can be adjusted by means of the voltage applied to the liquid-crystal layer 22. That is, it is possible to obtain a gray-scale display by using this method.

Figure 11:
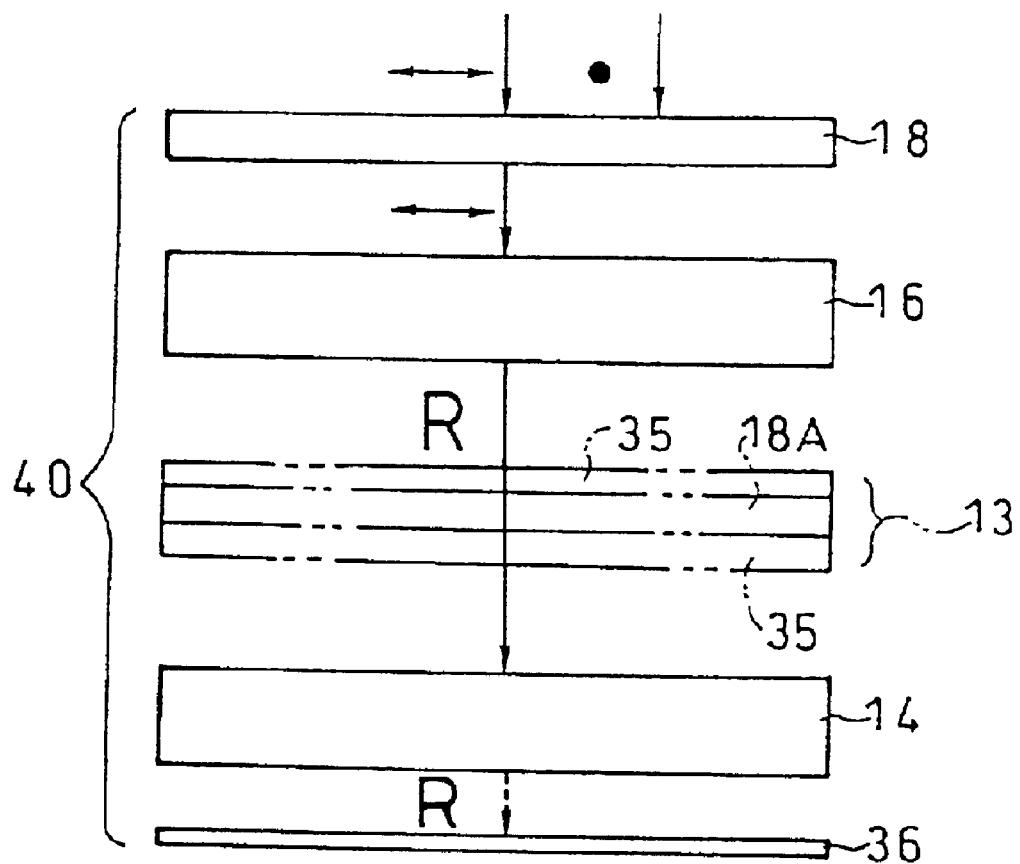
FIG. 11 is a cross-section view similar to FIG. 10, showing the condition of a dark display of the above-noted liquid-crystal display.

In the liquid-crystal layer 22, in the case of right-rotational circularly polarized light, after a component exiting from the liquid-crystal layer 22 and not reflected by the circular polarization separation layer 14 passes therethrough, it is absorbed by the light-absorbing layer 36 and removed, so that the dark display shown in FIG. 11 occurs. For this reason, in comparison with the left-rotational circularly polarized light L reflected by the circular polarization separation layer 14 and passing through the liquid-crystal cell 16, there is very good display contrast.

In the liquid-crystal display 40 as well, as shown by the two-dot-dash line of FIG. 10 and FIG. 11, and in the same manner as shown in FIG. 1 and FIG. 7, it is possible to dispose the auxiliary dichroic circular polarization layer 13 between the circular polarization separation layer 14 and the liquid-crystal cell 16.

By doing this, when light transmitted through the liquid-crystal cell 16 strikes the auxiliary dichroic circular polarization layer 13, left-rotational circularly polarized light is transmitted and right-rotational circularly polarized light is absorbed, so that there is a further improvement in contrast.

Figure 12:
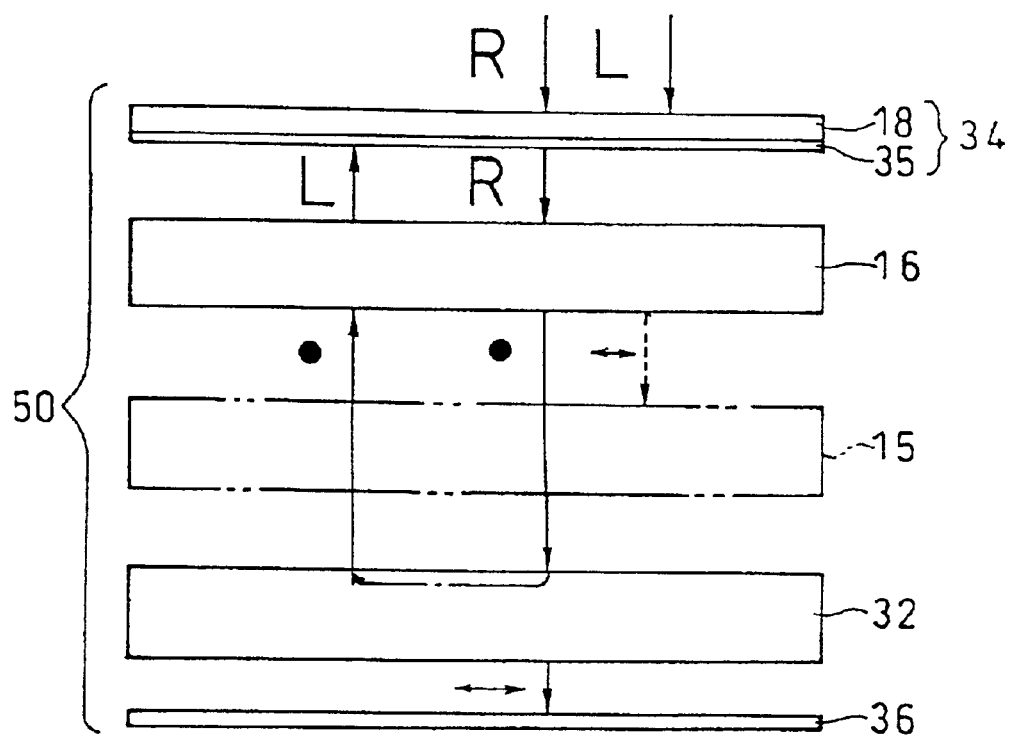
FIG. 12 is a cross-section view similar to FIG. 6, showing a liquid-crystal display according to a fourth embodiment of the present invention.

A reflective type liquid-crystal display 50 shown in FIG. 12 is described below.

This liquid-crystal display 50 has, in place of the light source 12 of the liquid-crystal display 30 shown in FIG. 8, the light-absorbing layer 36 as noted above, and has a modified dichroic circular polarization layer 34.

The dichroic circular polarization layer 34 is laminated so as to have a $\lambda/4$ phase-shifting layer on the side opposite that of the liquid-crystal cell 16 side in the dichroic linear polarization layer thereof in the liquid-crystal display 10 shown in FIG. 8, the phase-lead axis or phase-lag axis thereof being at an angle of $45°$ with respect to the transmission axis of the dichroic linear polarization layer.

In the liquid-crystal display 50, external light (unpolarized light) strikes the dichroic circular polarization layer 34 and only right-rotational circularly polarized light R strikes the liquid-crystal cell 16. The other left-rotational circularly polarized light L of the external light is absorbed by the dichroic circular polarization layer 34, so that there is no decrease in screen contrast caused by reflected light.

Because the liquid-crystal layer 22 has a retardation value so as to shift the phase of light substantially $\pi/2$, for the right-rotational circularly polarized light R striking the liquid-crystal layer 22, in terms of the Poincare sphere of FIG. 2, by the application of an electrical field to the liquid-crystal layer 22, the director D direction of the liquid-crystal layer is changed, resulting in a shift from the lower pole point to either the point V or the point E on the equator, representing linearly polarized light, the ellipticity of the circularly polarized light being modulated.

Therefore, linearly polarized light that has exited from the liquid-crystal cell 16, depending upon its polarization condition, is reflected by the linear polarization separation layer 32 or absorbed thereby. Thus, a high contrast condition is obtained.

In the example of FIG. 12, only a vertical linearly polarized light component is reflected by the linear polarization separation layer 32 so as to strike the liquid-crystal cell 16 once again, this being changed by the liquid-crystal layer to left-rotational circularly polarized light, which cannot pass through the dichroic circular polarization layer 34, so that the display does not become bright.

Figure 13:
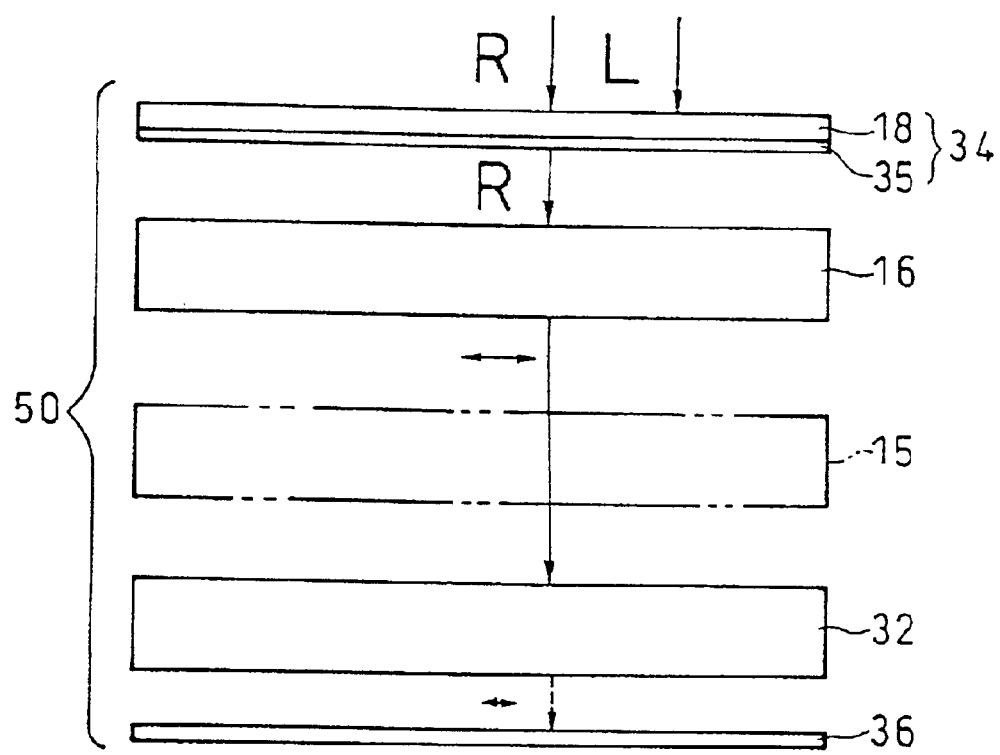
FIG. 13 is a cross-section view similar to FIG. 12, showing the condition of a dark display of the above-noted liquid-crystal display.

As shown in FIG. 13, when only vertical linearly polarized light exits from the liquid-crystal cell 16, this light passes through the linear polarization separation layer 32, and is absorbed by the light-absorbing layer 36, so that the dark display condition occurs.

In the aforementioned embodiments, the light source 12 is a transparent thin-film white planar light source made of a thin-film electroluminescent sources sandwiched between transparent resin sheets having transparent electrodes, with a reflective layer 12A made of, for example, a metal thin film provided on the rear thereof. It will be understood, however, that the present invention is not restricted in this manner, and can also use an edge-light type white planar light source in which light from a light source incident from a side edge of a light-guide sheet is caused exit one surface of the light-guide sheet, for example, by disposing a linear light source on a light-guide sheet. In this case, a reflective layer made of a metal thin film or the like is disposed on the other side of the light-guide sheet, and it is also possible to use white PET (polyethylene teraphthalate).

It is also possible to laminate a phase-shifting layer with a retardation value such that the phase of transmitted light is shifted substantially by $\pi/2$ on the circular polarization separation layer or linear polarization separation layer, the result being that this laminate has the same effect as a linear polarization separation layer or a circular polarization separation layer.

In general, there are two modes in a liquid crystal panel, one being the normally white mode, in which, depending upon the angle (direction angle) of the transmission axis of the dichroic polarizer with respect to the liquid crystal, light is transmitted when voltage is not applied to the liquid crystal, and the normally black mode, in which, light is not transmitted when there is no voltage applied to the liquid crystal, and it should be understood that the present invention can be applied to both the normally white mode and the normally black mode.

In the liquid-crystal display 50 as well, as shown by the two-dot-dash lines of FIG. 12 and FIG. 13, and similar to the case shown in FIG. 8 and FIG. 9, can have the auxiliary dichroic linear polarization layer 15 disposed between the linear polarization separation layer 32 and the liquid-crystal cell 16.

If this is done, linearly polarized light exiting from the liquid-crystal cell 16, if the polarization condition is vertical, absorbed by the auxiliary dichroic linear polarization layer 15, the remaining non-absorbed light being entirely absorbed by the light-absorbing layer 36, so that there is a further improvement in the contrast.

Figure 14:
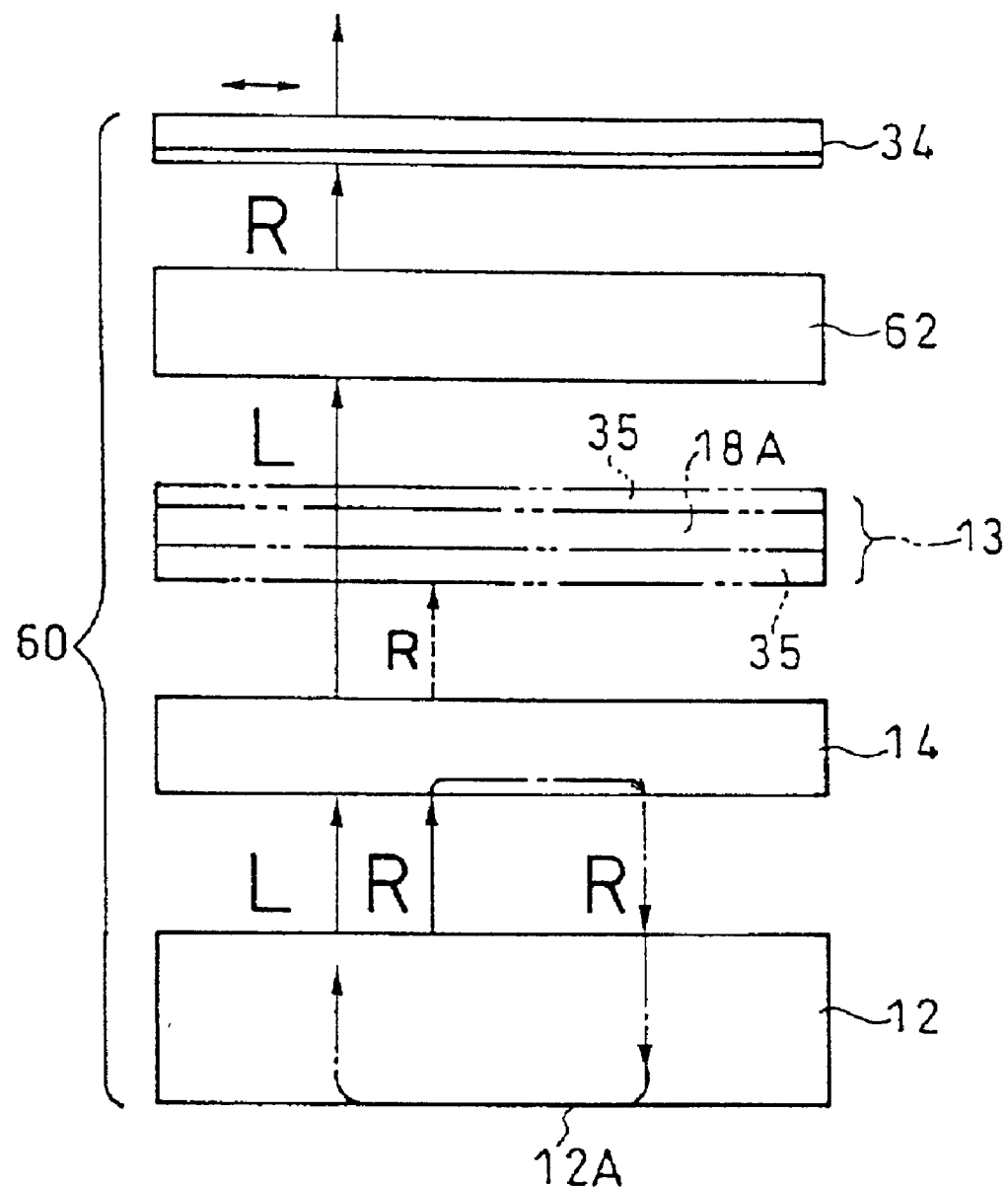
FIG. 14 is a simplified cross-section view showing an exploded view of the main part of a liquid-crystal display according to a fifth embodiment of the present invention.

Referring to FIG. 14, a liquid-crystal display 60 according to the fifth embodiment of the present invention has the light source 12, the circular polarization separation layer 14, a liquid-crystal cell 62 having a retardation value that changes with application of an electrical field to the liquid crystal, and which acts to shift the phase of incident circularly polarized light substantially 0 to $\pi$, and the light-absorbing type dichroic circular polarization layer 34 disposed on the side of the liquid-crystal cell 62 opposite from the circular polarization separation layer 14, which receives circularly polarized light that has been transmitted through the liquid-crystal cell 62.

In FIG. 14, elements corresponding to elements shown in FIG. 1, FIG. 4, and FIG. 9 have been assigned the same reference numerals and are not explicitly described herein.

Figure 15:
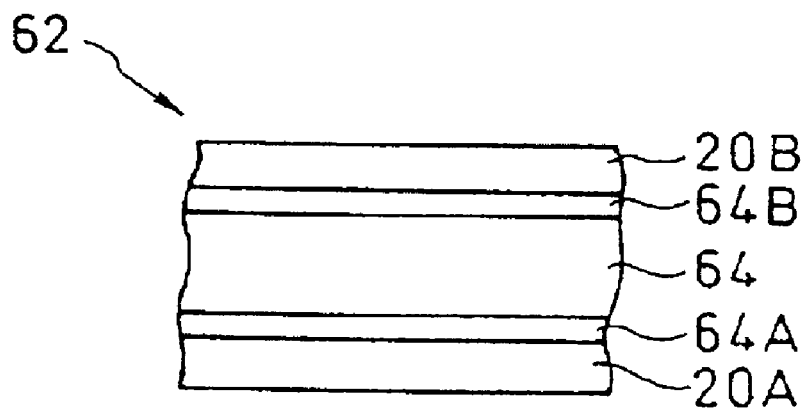
FIG. 15 is an enlarged cross-section view of a liquid-crystal cell in the above-noted liquid-crystal display.

The liquid-crystal cell 62, as shown in FIG. 15, is formed by a liquid-crystal layer 64 sandwiched between two substrates 20A and 20B as shown in FIG. 15, and a pair of pixel electrodes 64A and 64B disposed on the lower surface of the upper substrate 20A and the upper surface of the lower substrate 20B, and which sandwich the liquid-crystal layer 64 in the thickness direction.

The liquid-crystal layer 64 in the liquid-crystal cell 62 has a liquid crystal retardation value that changes with the application of an electrical field from the pixel electrodes 64A and 64B, this being adjusted so that the phase of circularly polarized incident light passing through the circular polarization separation layer 14 is shifted substantially 0 to $\pi$.

This adjustment can be done by various known liquid crystals, by control of the birefringence and thickness of the liquid-crystal layer 64.

Such liquid crystals are known as ECB (electrically controlled birefringence) liquid crystals, and have modes such as a DAP (deformation of vertical aligned phases) mode, a HAN (hybrid aligned nematic) mode, an STN (super twisted nematic) mode, an SBE (super twisted birefringence effect) mode, an SSGLC (surface stabilized ferroelectric liquid crystal) mode, an OCB (optically compensated bend) mode, and a VAN (vertically aligned nematic) mode.

While the OCB mode usually refers to a mode in which a bend aligned liquid-crystal layer and a biaxial phase shifting sheet are sandwiched between light-absorbing type dichroic linear polarizing sheets having light-absorbing axes that are mutually perpendicular, with regard to the present invention, the term will be used to refer to the bend aligned liquid-crystal cell only.

Similarly, while the VAN mode usually refers to a mode in which a VAN aligned cell of vertically sandwiched nematic liquid crystals is sandwiched between light-absorbing type dichroic linear polarizing sheets having light-absorbing axes that are mutually perpendicular, with regard to the present invention, the term will be used to refer to the VAN aligned liquid-crystal cell only The other modes are similar.

While the term ECB is often used to refer to a color display method which makes uses of birefringence, with regard to the present invention the term will be used to refer to a mode in which the birefringence value of a liquid-crystal layer changes.

The expression "shift the phase substantially 0 to $\pi$" refers to substantially changing the phase at the liquid-crystal layer 64 itself, or to the use of a phase shifting layer separate from the liquid-crystal cell 62, this being formed between the liquid-crystal cell 62 and the above-noted first dichroic circular polarization layer 34 and/or between the liquid-crystal cell 62 and the circular polarization separation layer 14, the mutual interaction between the liquid-crystal layer 64 and the phase-shifting layer acting to substantially shift the phase of light passing therethrough by 0 to $\pi$.

For example, by changing the retardation value o the liquid-crystal layer 64 itself from $0.1\pi$ to $1.1\pi$, or by the mutual interaction between the liquid-crystal layer 64 and the dichroic circular polarization layer 14 and/or with a phase-shifting layer having a retardation value of substantially $0.1\pi$ provided separately on the circular polarization separation layer 14 causes the phase of light passing therethrough to shift substantially from 0 to $\pi$.

The above-noted mutual interaction is the action that occurs, for example, when lead axis or lag axis of a phase shifting layer having a retardation value of substantially $0.1\pi$ is caused to intersect perpendicularly with the lead axis or lag axis of a liquid-crystal layer when the retardation thereof is $0.1\pi$ or $1.1\pi$. For example, the calculations would be $0.1\pi-0.1\pi=0$, and $1.1\pi-0.1\pi=\pi$.

It will be understood that the action of changing the phase substantially from $-\pi$ to 0 is also within the scope of the present invention.

When the phase of circularly polarized light is shifted by $\pi$, it is changed to circular polarization layer of the opposite rotational direction.

In the liquid-crystal display 60, of the unpolarized light exiting from the light source 12, for example as shown in FIG. 14 a left-rotational circularly polarized light component L is transmitted through the circular polarization separation layer 14 and reaches the liquid-crystal cell 62.

The other, right-rotational circularly polarized light component R is reflected at the circular polarization separation layer 14, and when it is reflected by the reflective layer 12A of the light source 12 its phase is reversed or it becomes unpolarized, becoming left-rotational circularly polarized light passing through the circular polarization separation layer 14 which then strikes the liquid-crystal cell 62.

By applying a voltage to the liquid-crystal layer 64 of the liquid-crystal cell 62 from the pixel electrodes 64A and 64B, the retardation value is caused to change, thereby shifting the phase of the light transmitted through the liquid-crystal cell 62 substantially 0 to $\pi$ by the application of an electrical field. Therefore, when left-rotational circularly polarized light L striking the liquid-crystal cell 62 undergoes the maximum shift of $\pi$, it becomes right-rotational circularly polarized light R with a reversed rotational direction, and exits from the liquid-crystal cell 62.

If the polarization transmission axis of the dichroic circular polarization layer 34 is made to coincide with one of the two rotational directions, for example, with right rotation, by controlling an electrical field applied to the liquid-crystal layer 64, it is possible to adjust the amount of right-rotational circularly polarized light R that passes through the dichroic circular polarization layer 34, thereby achieving a liquid crystal display function.

Describing this in terms of the Poincare sphere of FIG. 2, with a shift from the upper pole point on the Poincare sphere of 0 to $\pi/2$, $\pi/2$, and $\pi/2$ to $\pi$, via a point H on the equator, with a direction angle of $\lambda=0$, left-rotational circularly polarized light changes to left-rotational elliptically polarized light, then horizontal linearly polarized light, right-rotational elliptically polarized light, and finally right-rotational circularly polarized light.

Figure 16:
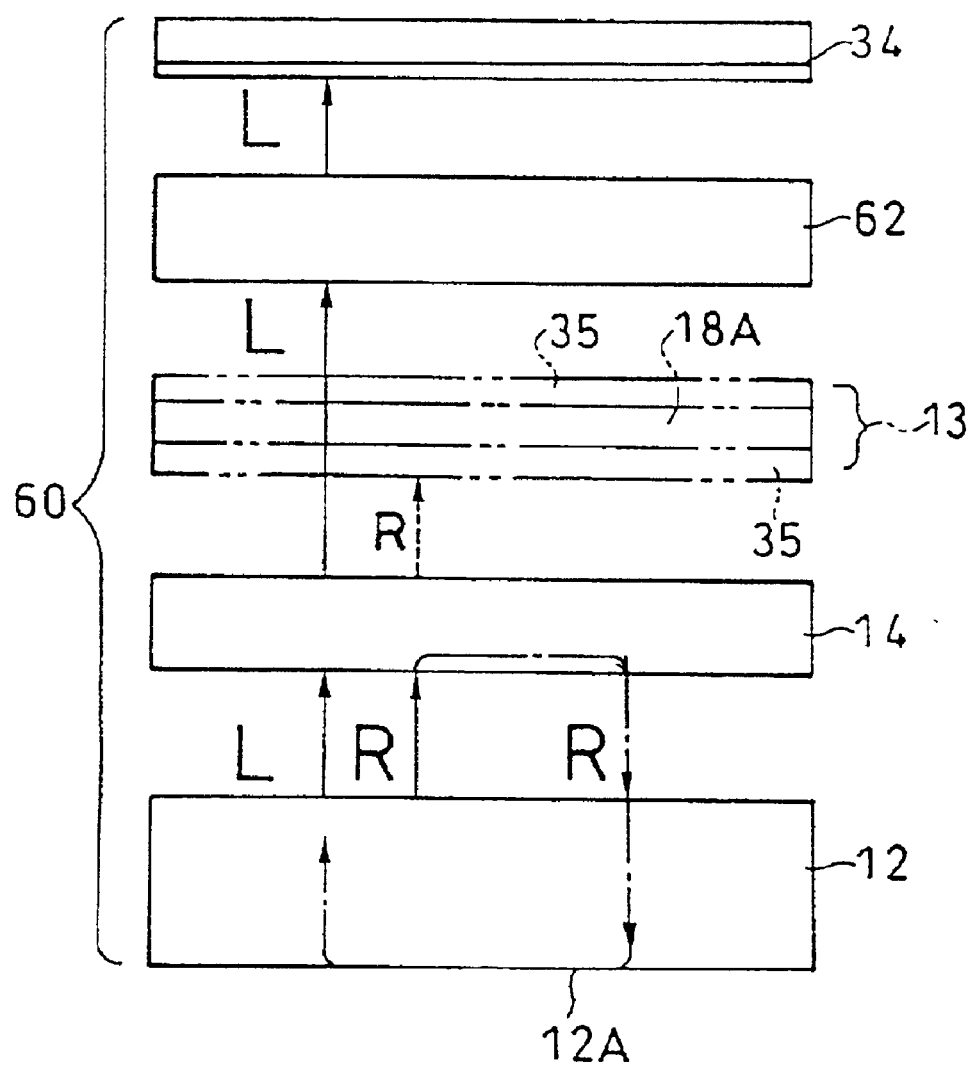
FIG. 16 is a simplified cross-section view showing the condition of a dark display in the above-noted liquid-crystal display.

Therefore, in the shift range from 0 to $\pi/2$, the dark display condition such as shown in FIG. 16 occurs, and in the shift range from $\pi/2$ to $\pi$, the larger the shift amount is the more light passes through the dichroic circular polarization layer 34, thereby enabling a gray-scale display.

Because the dichroic circular polarization layer 34 is a light-absorbing type dichroic polarizer, even if external (unpolarized) light strikes the surface thereof, 50% of the light is absorbed, and the remaining 50% is transmitted, so that there is almost no reflected component, thereby enabling a great suppression of a reduction in screen contrast in the liquid-crystal display 60.

By using the brirefringence of the liquid-crystal layer 64, it is possible to achieve a color liquid crystal display function without having to provide a separate color filter.

In the liquid-crystal display 60 as well, the auxiliary dichroic circular polarization layer 13 can be disposed between the circular polarization separation layer 14 and the liquid-crystal cell 62.

By doing this, right-rotational circularly polarized light R that was not reflected by the circular polarization separation layer 14 is absorbed by the auxiliary dichroic circular polarization layer 13. Therefore, it is possible to achieve a condition with extremely good contrast.

Figure 17:
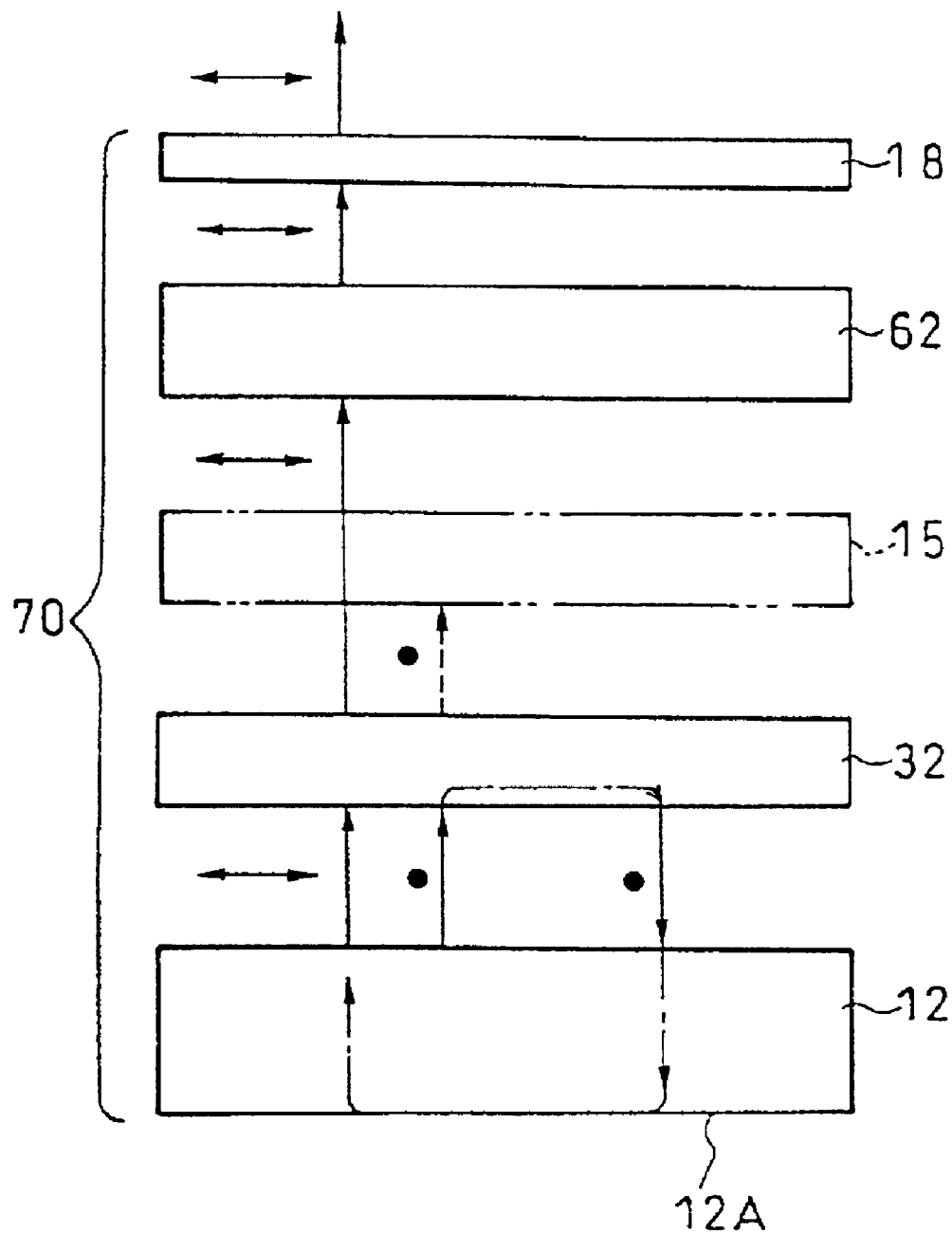
FIG. 17 is a simplified cross-section view showing an exploded view of the main part of a liquid-crystal display according to a sixth embodiment of the present invention.

A liquid-crystal display 70 according to the sixth embodiment of the present invention and shown in FIG. 17 is described below.

The liquid-crystal display 70 has the light source 12, the linear polarization separation layer 32, which of light exiting from the light source 12 transmits one linearly polarized light component and reflects a linearly polarized light component perpendicular thereto, the liquid-crystal cell 62, and the light-absorption type dichroic linear polarization layer 18 that receives polarized light that has been transmitted through the liquid-crystal cell 62.

In the liquid-crystal display 70, one linearly polarized light component of unpolarized light from the light source is transmitted by the linear polarization separation layer 32, and a linearly polarized light component perpendicular thereto is reflected.

When the reflected linearly polarized light component is reflected by the reflective layer 12A of the light source 12, a light scattering sheet or the like disposed in the light path (not shown in the drawing) changes it to unpolarized light, which passes through the linear polarization separation layer 32.

Linearly polarized light that has passed through the linear polarization separation layer 32 strikes the liquid-crystal layer 64 at which, by the action of an electrical field, the phase thereof is shifted substantially 0 to $\pi$.

If the phase of linearly polarized light is shifted by $\pi$, it becomes linearly polarized light of a direction that is perpendicular to the above-noted linearly polarized light.

Figure 18:
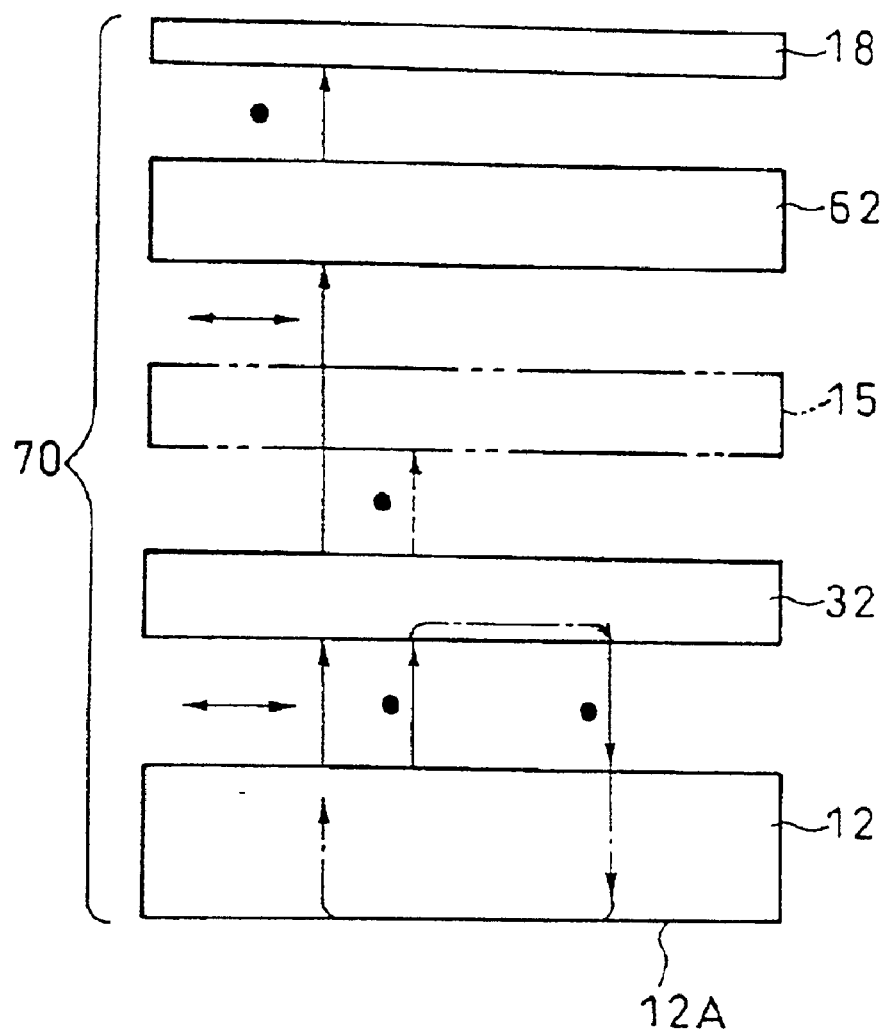
FIG. 18 is a simplified cross-section view showing the condition of a dark display in the above-noted liquid-crystal display.

Described in terms of the Poincare sphere of FIG. 2, with a shift from a point H on the equator of the Poincare sphere of 0 to $\pi$ with a direction angle of $\lambda=0$, horizontal linearly polarized light becomes left-rotational elliptically polarized light, then right-rotational circularly polarized light, then right-rotational elliptically polarized light, and finally vertical linearly polarized light. Therefore, the larger is the amount of shift, the smaller is the amount of light passing through the dichroic circular polarization layer. The dark display condition is shown in FIG. 18.

Therefore, by controlling the voltage applied to the liquid-crystal layer 64 from the pixel electrodes 64A and 64B, it is possible to adjust the amount of light transmitted through the dichroic linear polarization layer 18. That is, it is possible to achieve a liquid crystal display function with gray-scale capability.

This can be represented by Equation (6).

$$I=I_0\sin^2 2\theta\sin^2(\pi d\Delta n(V)/\lambda) \tag{6}$$

In the above, I is the intensity of light transmitted through the dichroic linear polarization layer 18, $I_0$ is the intensity of incident light, $\theta$ is the angle formed between the incident light direction and the normal light oscillation direction in the liquid-crystal cell, $\Delta n(V)$ and d are the birefringence at an applied voltage of V an the cell thickness, and $\lambda$ is the wavelength of the incident light.

In the liquid-crystal display 70, even if unpolarized external light is received, the dichroic linear polarization layer 18 absorbs 50% thereof, so that it is possible to suppress the reduction in screen contrast caused by reflection.

In the liquid-crystal display 70 as well, an auxiliary dichroic linear polarization layer 15 can be disposed between the linear polarization separation layer 32 and the liquid-crystal cell 62. The action of this auxiliary linear polarization separation layer 15 is the same as described above.

While both the above-noted liquid-crystal displays 60 and 70 are transmissive types, it will be understood that the present invention is not restricted in this manner, and can be applied as well to a reflective type of liquid-crystal display.

Figure 19:
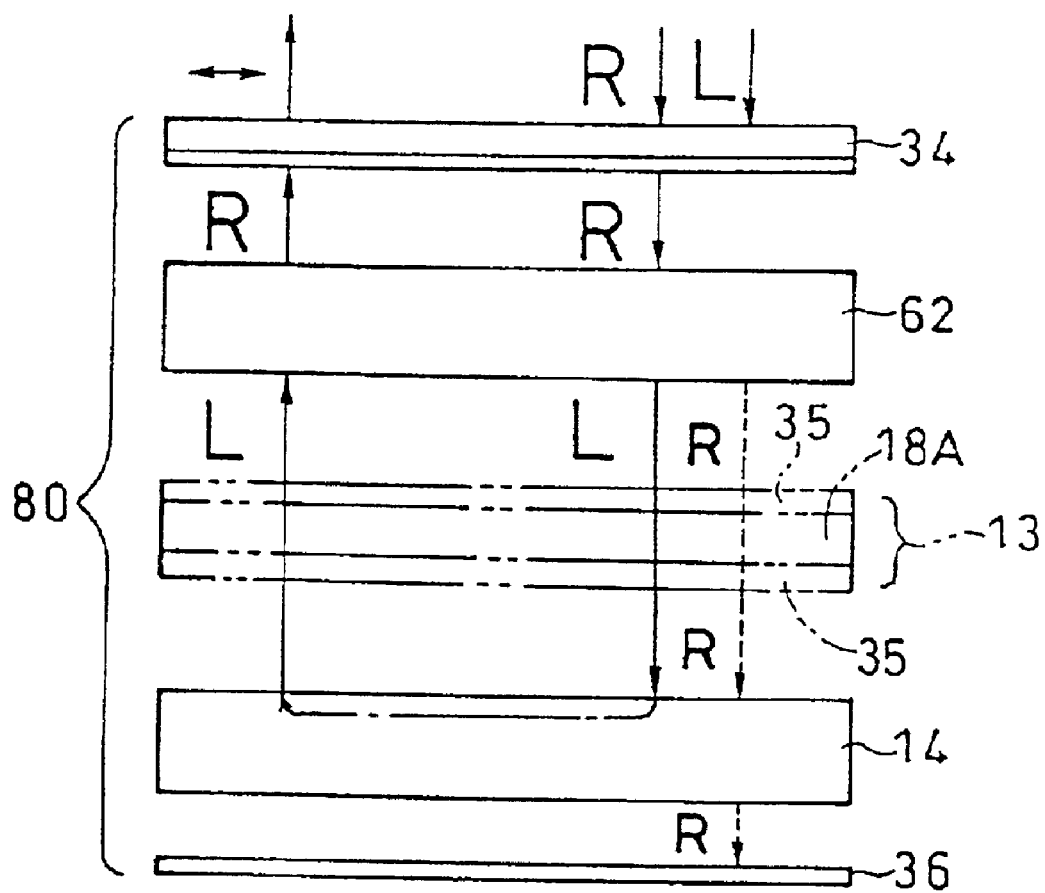
FIG. 19 is a cross-section view similar to FIG. 14, showing a liquid-crystal display according to a seventh embodiment of the present invention.

The liquid-crystal display 80 shown in FIG. 19 is the liquid-crystal display 60 of FIG. 14, except that is made a reflective type, in which the light-absorbing layer 36 is provided in place of the light source 12 of FIG. 14.

Other aspects and elements of the configuration are the same as the liquid-crystal display 60 shown in FIG. 14 and corresponding elements have been assigned the same reference numerals, and are not explicitly described herein. The dichroic circular polarization layer 34 is set so as to transmit right-rotational circularly polarized light and the circular polarization separation layer 14 is set so as to reflect left-rotational circularly polarized light.

In this reflective type liquid-crystal display 80, external (unpolarized) light strikes the dichroic circular polarization layer 34 and, of the right-rotational and left-rotational circularly polarized light components, right-rotational circularly polarized light R strikes the liquid-crystal cell 62. The other circularly polarized light component of the incident light, that is, the left-rotational circularly polarized light L is absorbed by the dichroic circular polarization layer 34, so that there is no reduction in screen contrast by reflected light.

The polarization axis of right-rotational circularly polarized light R striking the liquid-crystal layer 62, in accordance with a liquid crystal retardation value that varies with a change in the electrical field applied to the liquid-crystal cell 62, is shifted substantially 0 to $\pi$.

Described in terms of the Poincare sphere of FIG. 2, as shown in FIG. 19, if right-rotational circularly polarized light striking the liquid-crystal cell 62, on the Poincare sphere of FIG. 2, is shifted from the lower pole by a shift amount of 0 to π/2, it becomes right-rotational elliptically polarized light, If the shift amount is π/2 the shift is to the point V on the equator, this representing vertical linearly polarized light, if the shift amount is π/2 to π, the shift is to the upper hemisphere, representing left-rotational elliptically polarized light, and if the shift amount is π, the light exits the liquid-crystal cell 62 as circularly polarized light.

In this manner, the rotational direction of the circularly polarized light is established by modulation of the polarization axis, and when light strikes the circular polarization separation layer 14, it is reflected if the rotational direction is left and transmitted if the rotational direction is right.

Therefore, it is possible to adjust the amount of light reflected from the circular polarization separation layer 14 and passed through the liquid crystal cell 62 by means of the voltage applied to the liquid-crystal layer 64.

Left-rotational circularly polarized light L reflected at the circular polarization separation layer 14 returns to the liquid-crystal cell 62 with the same rotational direction as noted above, the polarization axis being again modulated by 0 to π, it thereby becoming right-rotational circularly or elliptically polarized light, which exits via the dichroic circular polarization layer 34 and becomes display light, while a polarized light component that has exited from the liquid-crystal layer 64 and passed through the circular polarization separation layer 14 (included leaking light through the polarizer 35) is, as noted above, a small amount, this being absorbed and removed by the light-absorbing layer 36.

For this reason, there is good display contrast in relation to the polarized light (display light) that has been reflected by the circular polarization separation layer 14 and transmitted through the liquid-crystal cell 62.

By using the birefringence of the liquid-crystal layer 64, it is possible to achieve a color liquid-crystal display function, without the need for a separately provided color filter.

In the liquid-crystal display 80 as well, it is possible to dispose an auxiliary circular polarization layer 13 between the circular polarization separation layer 14 and the liquid-crystal cell 62.

In this case, at the auxiliary circular polarization layer 13 before the circular polarization separation layer 14, because right-rotational circularly polarized light R of the transmitted light from the liquid-crystal cell 62 is absorbed, there is almost no transmitted component through the circular polarization separation layer 14. For this reason, it is possible to achieve a further improvement in contrast.

Figure 20:
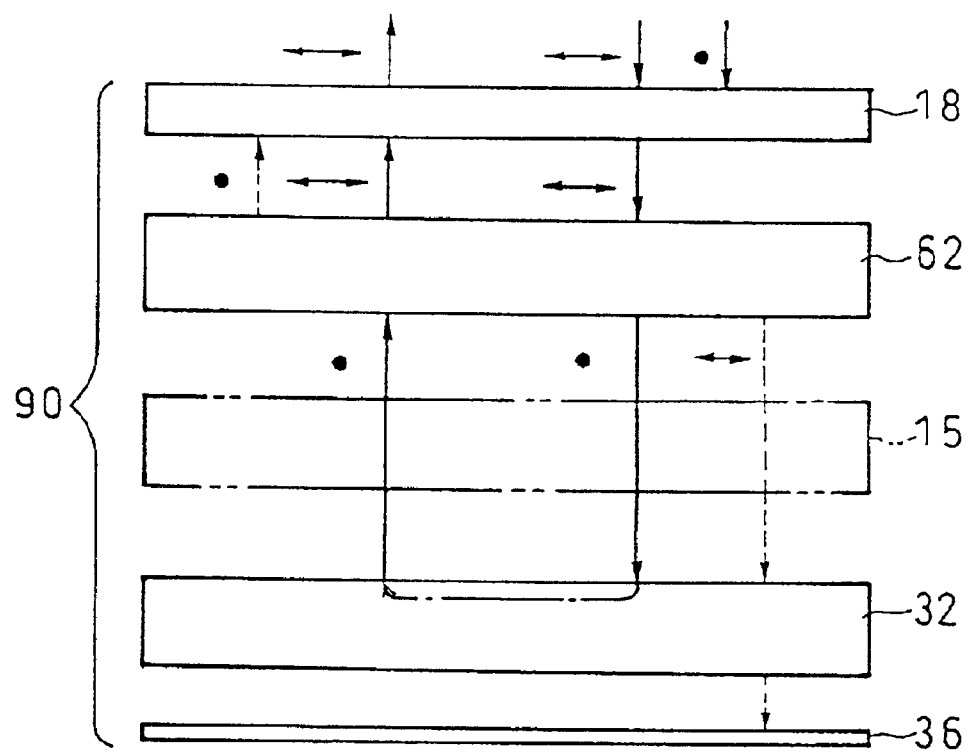
FIG. 20 is a cross-section view similar to FIG. 14, showing a liquid-crystal display according to a eight embodiment of the present invention.

A reflective type liquid-crystal display 90 shown in FIG. 20 is described below.

The liquid-crystal display 90 has, in place of the light source 12 of the liquid-crystal display 70 shown in FIG. 17, the light-absorbing layer 36.

In the liquid-crystal display 90, when external light (unpolarized light) is transmitted through the dichroic linear polarization layer 18, it is changed to linearly polarized light, which strikes the liquid-crystal cell 62. Of the external light, a component which cannot be transmitted through the dichroic linear polarization layer 18 is absorbed thereby. Therefore, there is almost no reflected light, making it possible to suppress a reduction in contrast caused by reflected light.

Linearly polarized light that has passed through the dichroic linear polarization layer 18, in accordance with the liquid-crystal layer retardation value that changes with an electrical field applied to the liquid-crystal layer 64, undergoes a phase shift of substantially 0 to π.

Described in terms of the Poincare sphere of FIG. 2, horizontal linearly polarized light, for example, as represented by point H on the equator is shifted in the positive direction by 0 to π/2, thereby becoming right-rotational elliptically polarized light, is shifted by π/2 to become right-rotational totally circularly polarized light represented by the lower pole point on the Poincare sphere, is shifted by π/2 to π to become right-rotational elliptically polarized light, and is shifted by π to become vertical linearly polarized light.

Therefore, the left-rotational elliptically or circularly polarized light exiting from the liquid-crystal cell 62, depending upon the polarization axis thereof, is reflected at the linear polarization separation layer 32, with other light passing through the linear polarization separation layer 32. Linearly polarized light having passed through the linear polarization separation layer 32 returns to the liquid-crystal cell 62 with a direction the opposite of that noted above, at which point it undergoes a phase shift of substantially 0 to π, and strikes the dichroic linear polarization layer 18, with only a horizontal linearly polarized light transmitted. Therefore, a condition of extremely good contrast is achieved.

It is also possible to have an arrangement in which, when no voltage is applied to the liquid-crystal layer of the liquid-crystal cell from the pixel electrodes, the phase of light transmitted through the liquid-crystal cell is shifted substantially π/2, and when a voltage is applied to the electrodes, the phase of light transmitted through the liquid-crystal cell is substantially unshifted.

In the liquid-crystal display 90 as well, it is possible to dispose an auxiliary linear polarization layer 15 between the linear polarization separation layer 32 and the liquid-crystal cell 62.

The function of the auxiliary linear polarization layer 15 is as above described.

Figure 21:
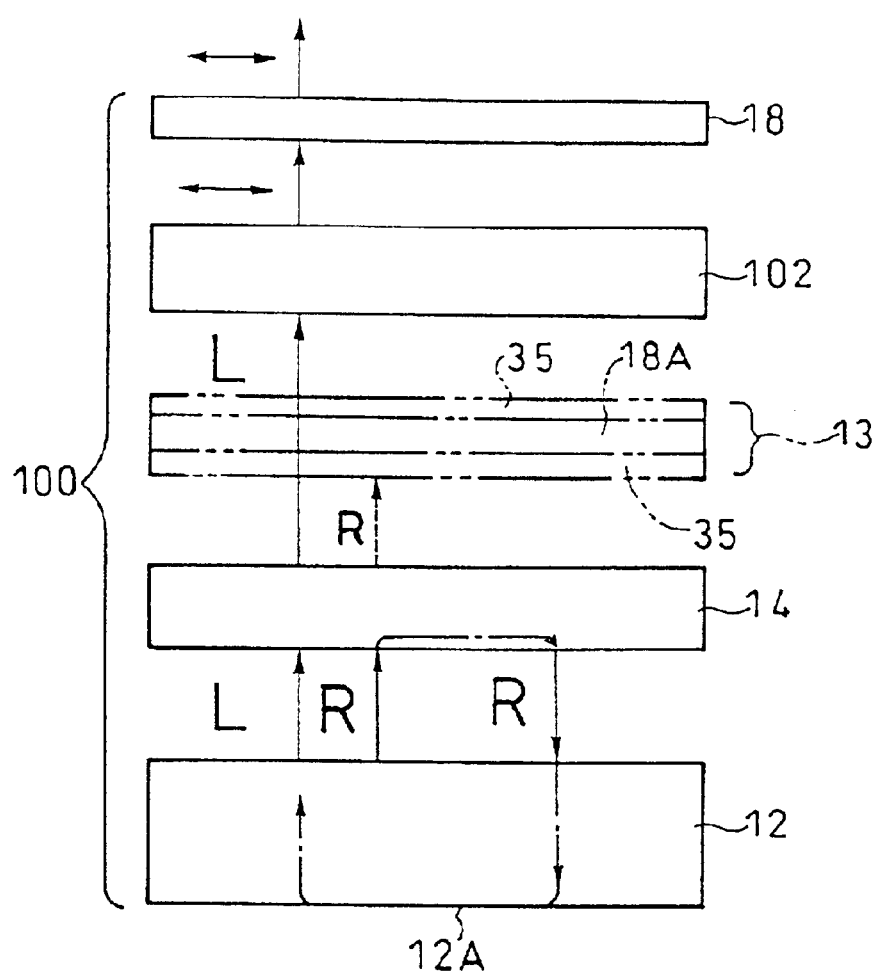
FIG. 21 is a simplified cross-section view showing an exploded view of the main part of a liquid-crystal display according to a ninth embodiment of the present invention.

As shown in FIG. 21, a liquid-crystal display 100 according to the ninth embodiment of the present invention has the light source 12, the circular polarization separation layer 14, a liquid-crystal cell 102 having a liquid crystal retardation value that changes with the application of an electrical field thereto, and which acts to shift the phase of incident light transmitted through the circular polarization separation layer 14 by substantially −π/2 to π/2, and the light-absorption type dichroic linear polarization layer 18 disposed on the side of the liquid-crystal cell 102 opposite from the circular polarization separation layer 14 and which receives light that has passed through the liquid-crystal cell 102.

Figure 22:
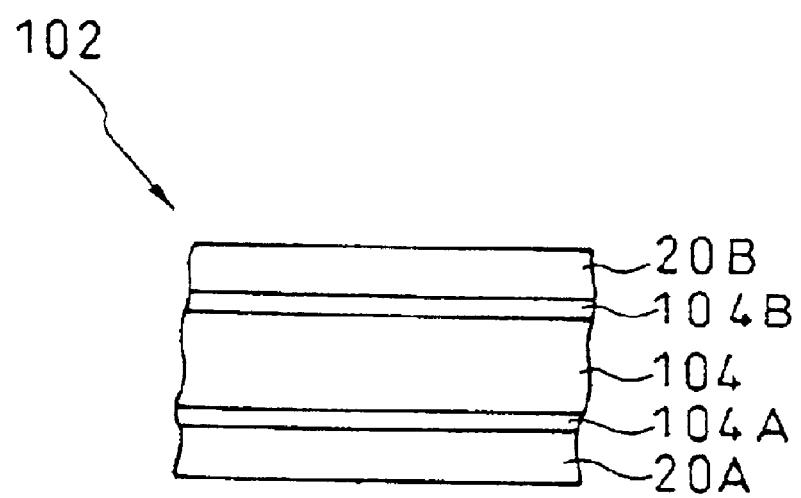
FIG. 22 is an enlarged cross-section view of a liquid-crystal cell in the above-noted liquid-crystal display.

The liquid-crystal cell 102, as shown in FIG. 22, has a liquid-crystal layer 104 sandwiched between two substrates 20A and 20B, and a pair of pixel electrodes 104A and 104B disposed on the lower surface of the upper substrate 20A and the upper surface of the lower substrate 20B, which sandwich the liquid-crystal layer 104 in the thickness direction.

The liquid-crystal layer 104 in the liquid-crystal cell 102 has a retardation value that changes with application of an electrical field from the pixel electrodes 104A and 104B, this being adjusted so as to shift the phase of circularly polarized light that has passed through the circular polarization separation layer 14 by substantially −π/2 to π/2.

Since the above-noted configuration is the same as the liquid-crystal layer 64 shown in FIG. 15, this adjustment will not be described herein.

The above-noted phrase "shifted . . . substantially −π/2 to π/2" refers to substantially changing the phase at the liquid-crystal layer 102 itself, or to the use of a phase shifting layer separate from the liquid-crystal cell 102, this being formed between the liquid-crystal cell 102 and the above-noted dichroic circular polarization layer 34, the mutual interaction between the liquid-crystal layer 104 and the phase-shifting layer acting to substantially shift the phase of light passing therethrough by $-\pi/2$ to $\pi/2$.

For example, if the retardation value of the liquid-crystal layer 104 itself is varied from 0 to $\pi$, the phase difference between the liquid-crystal layer 104 and the dichroic circular polarization layer 34 and/or the mutual interaction with a phase difference which is substantially a $\pi/2$ provided separately in the circular polarization separation layer 14 encompasses a shift of substantially $-\pi/2$ to $\pi/2$ in the phase of light passing therethrough. The above-noted mutual interaction is the effect that occurs when, with respect to the phase-lead axis or the phase-lag axis when the retardation value of the liquid-crystal layer is $\pi$, the retardation value is substantially $\pi/2$, which is the phase-lead axis or phase-lag axis of the phase-shifting layer that are caused to intersect perpendicularly, for example, this being calculatable as $0-\pi/2=-\pi/2$, and $\pi-\pi/2=\pi/2$.

It will be understood that the use of a liquid-crystal cell having the effect of shifting the phase by substantially $\pi/2$ to $-\pi/2$ is encompassed in the present invention.

When the phase of circularly polarized light is shifted by $\pi/2$, it becomes linearly polarized light, and when it is shifted $-\pi/2$ it becomes linearly polarized light that is perpendicular to the above-noted linearly polarized light. When the phase of linearly polarized light is shifted by $\pi/2$ it becomes circularly polarized light, and when it is shifted by $-\pi/2$ it becomes circularly polarized light of the opposite rotational direction.

In a liquid-crystal display 100 as described above, of unpolarized light exiting from the light source 12, circularly polarized light of one rotational direction, for example left-rotational circularly polarized light L as shown in FIG. 21 is transmitted through the circular polarization separation layer 14, so that it reaches the liquid-crystal cell 102.

The other, right-rotational circularly polarized light R is reflected by the circular polarization separation layer 14, and when it is reflected by the reflective layer 12A of the light source 12, its phase is reversed, or it becomes unpolarized light, so that the amount of left-rotational circularly polarized light L transmitted through the circular polarization separation layer 14 increases, and strikes the liquid-crystal cell 102.

By applying a voltage from the pixel electrodes 104A and 104B to the liquid-crystal layer 104, the retardation value of the liquid crystal is changes, so that the circularly polarized light passing through the liquid-crystal cell 102 is shifted by the applied electrical field substantial by $-\pi/2$ to $\pi/2$.

Therefore, when the phase of circularly polarized light striking the liquid-crystal cell 12 is shifted by $\pi/2$, it becomes linearly polarized light, and when it is shifted by $-\pi/2$ it becomes linearly polarized light of a direction perpendicular thereto, which exits from the liquid-crystal cell 102.

By causing the polarization transmission axis of the dichroic linear polarization layer 18 to coincide with one of the two polarization directions, by controlling the electrical field applied to the liquid-crystal layer 104, it is possible to adjust the amount of light passing through the dichroic linear polarization layer 18, thereby enabling a liquid crystal display function and, of course, a gray-scale display as well.

Described in terms of the Poincare sphere of FIG. 2, by shifting to the point B on the equator with a direction angle of $\lambda=0$ by 0 to $\pi/2$ from the upper pole point on the Poincare sphere, left-rotational circularly polarized light is changed to elliptical polarized light, and then changed to horizontal linearly polarized light, and if a shift is made from the point V on the equator by 0 to $-\pi/2$, left-rotational circularly polarized light becomes vertical linearly polarized light.

Figure 23:
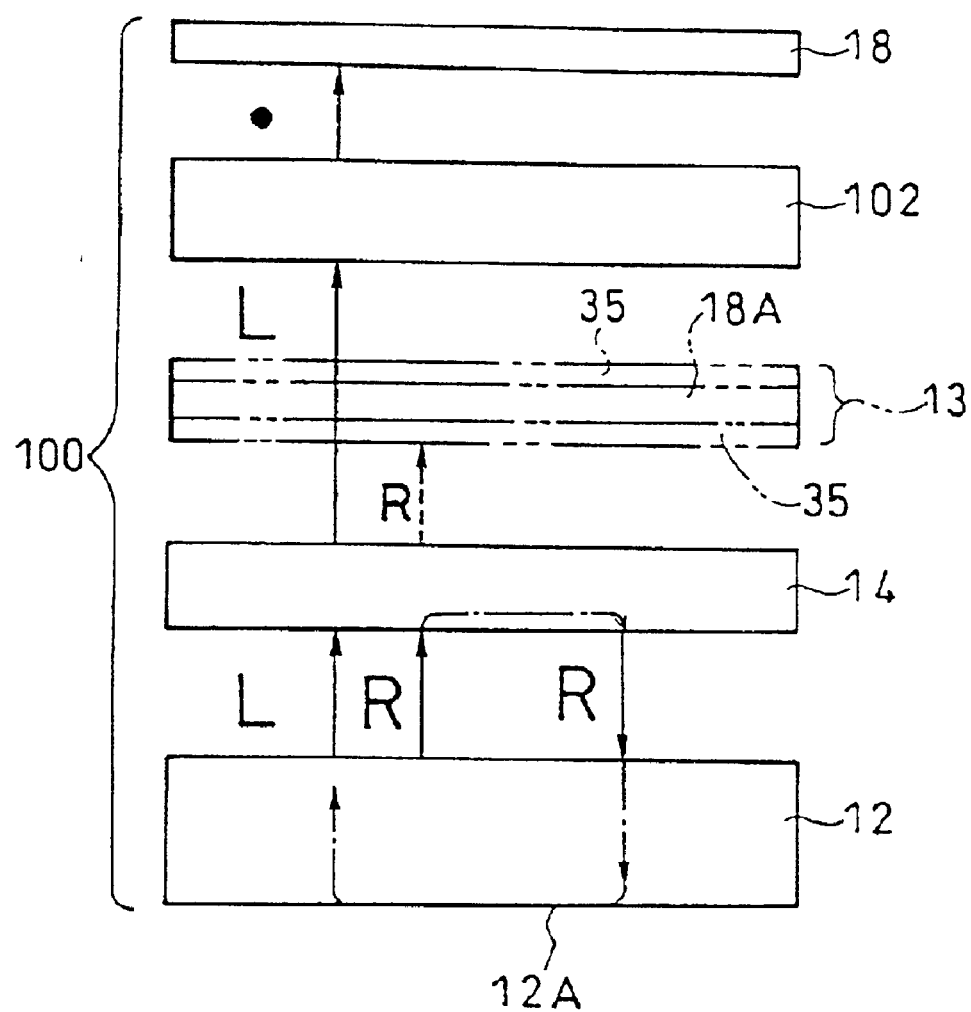
FIG. 23 is a simplified cross-section view showing the condition of a dark display in the liquid-crystal display of FIG. 21.

Therefore, when amount of shift of 0 to $\pi/2$, the larger the amount of shift is, the greater is the amount of light passing through the dichroic linear polarization layer 18, and with an amount of shift of 0 to $-\pi/2$, the larger the amount of shift is, the darker is the display, until it finally reaches the dark display shown in FIG. 23.

Because the dichroic linear polarization layer 18 is made of a light-absorption type dichroic polarizer, even if external (unpolarized) light strikes the surface of the dichroic linear polarization layer 18, 50% thereof is absorbed, the remaining 50% being transmitted, so that there is almost no reflected component, thereby enabling great suppression of a loss of screen contrast in the liquid-crystal display 100.

By using the birefringence of the liquid-crystal layer 104, it is possible to achieve a color display function without the need to use a separate color filter.

In the liquid-crystal display 100 as well, it is possible to dispose the auxiliary dichroic circular polarization layer 13 between the circular polarization separation layer 14 and the liquid-crystal cell 102.

In this case, at the auxiliary circular polarization layer 13 before the circular polarization separation layer 14, because right-rotational circularly polarized light R of the transmitted light from the liquid-crystal cell 102 is absorbed, there is almost no transmitted component through the circular polarization separation layer 14. For this reason, it is possible to achieve a further improvement in contrast.

Figure 24:
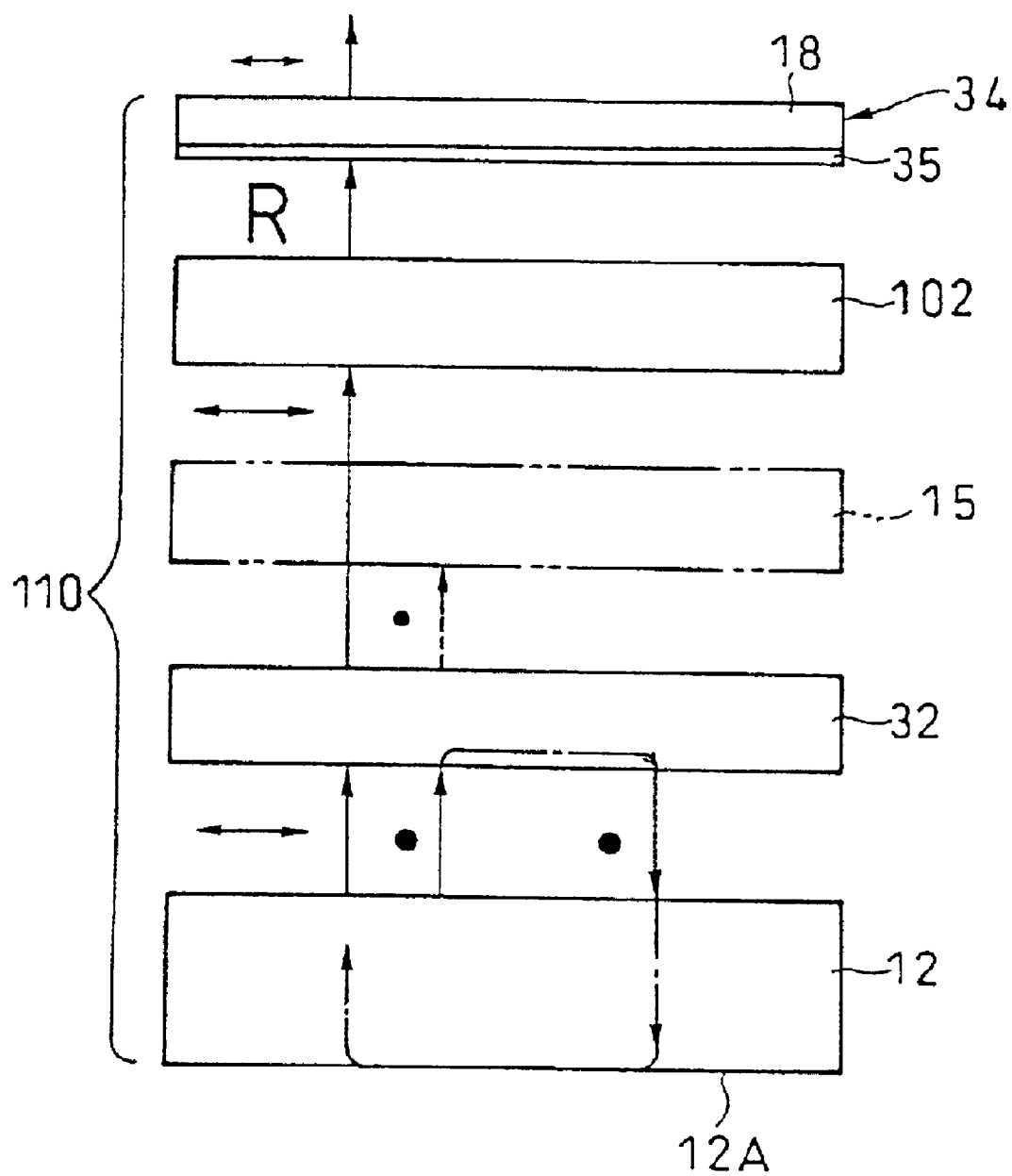
FIG. 24 is a simplified cross-section view showing an exploded view of the main part of a liquid-crystal display according to a tenth embodiment of the present invention.

A liquid-crystal display 110 according to the tenth embodiment of the present invention, shown in FIG. 24, is described below.

The liquid-crystal display 110 has the light source 12, the linear polarization separation layer 32 which, of the light exiting from the light source 12 transmits a linearly polarized light component of one direction within the plane of the drawing (which will be taken as horizontal in this example) and reflects a linearly polarized light of a direction perpendicular thereto, the liquid-crystal cell 102, and the light-absorption type dichroic circular polarization layer 34, which receives polarized light that passes through the liquid-crystal cell 102.

In the liquid-crystal display 110, of the unpolarized light from the light source 12, a horizontal linearly polarized light component is transmitted through the linear polarization separation layer 32 and a linearly polarized light component perpendicular thereto is reflected.

The reflected linearly polarized light component is reflected to the reflective layer 12A of the light source 12 or reflected within the light source 12 (by, for example, a light scattering function thereof), so that its phase is disturbed, resulting in an increase in the component passing through the linear polarization separation layer 32.

Linearly polarized light having passed through the linear polarization separation layer 32 strikes the liquid-crystal cell 102, and has its phase shifted by the electrical field applied thereto.

By applying a voltage to the liquid-crystal layer 104 from the pixel electrodes 104A and 104B, the retardation value of the liquid crystal is changed, thereby shifting linearly polarized light passing through the liquid-crystal cell 102 by the action of the electrical field by substantially $-\pi/2$ to $\pi/2$.

When the phase of linearly polarized light which strikes the liquid-crystal cell 102 is shifted by $\pi/2$, it becomes circularly polarized light, and when it is shifted by $-\pi/2$ it becomes circularly polarized light of the opposite rotational direction, whereupon it exits from the liquid-crystal cell 102.

Figure 25:
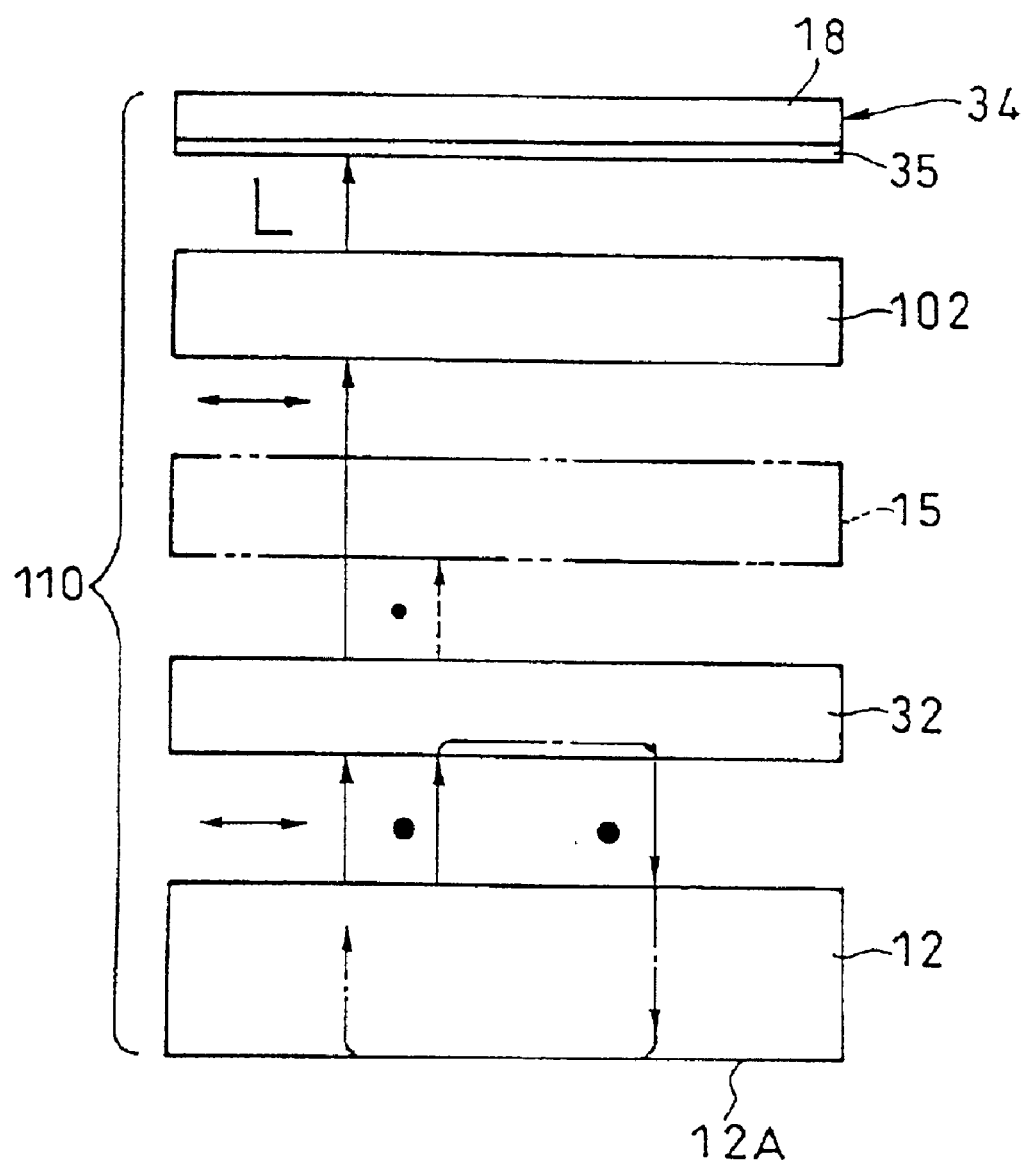
FIG. 25 is a cross-section view similar to FIG. 24, showing the condition of a dark display in the above-noted liquid-crystal display.

Described in terms of the Poincare sphere of FIG. 2, if a shift of 0 to π/2 is made at a direction angle of λ=0 from the point H on the equator of the Poincare sphere, horizontal linearly polarized light becomes right-rotational elliptically polarized light and then right-rotational circularly polarized light. Therefore, the larger the amount of the shift, the greater is the amount of light passing through the dichroic circular polarization layer 34. If a shift of 0 to π is made from the above-noted point H, the display will darken according to the amount of the shift, until at −π/2 when it reaches the dark display condition as shown in FIG. 25.

By causing the polarization transmission axis of the dichroic circular polarization layer 34 to coincide with the right-rotational component of two rotational directions, similar to the case of the liquid crystal cell 62 of FIG. 14, by controlling the electrical field applied to the liquid-crystal layer 104, it is possible to adjust the amount of light transmitted through the dichroic circular polarization layer 18, thereby enabling achievement of a liquid crystal display function and a gray-scale display as well.

In the liquid-crystal display 110 as well it is possible to dispose the auxiliary dichroic linear polarization layer 15 between the linear polarization separation layer 32 and the liquid-crystal cell 102.

In this case, linearly polarized light transmitted through the linear polarization separation layer 32 passes through the auxiliary dichroic linear polarization layer 15, and the remaining linearly polarized light that is not reflected by the linear polarization separation layer 32 is absorbed. Therefore, it is possible to achieve an extremely good contrast condition.

Figure 26:
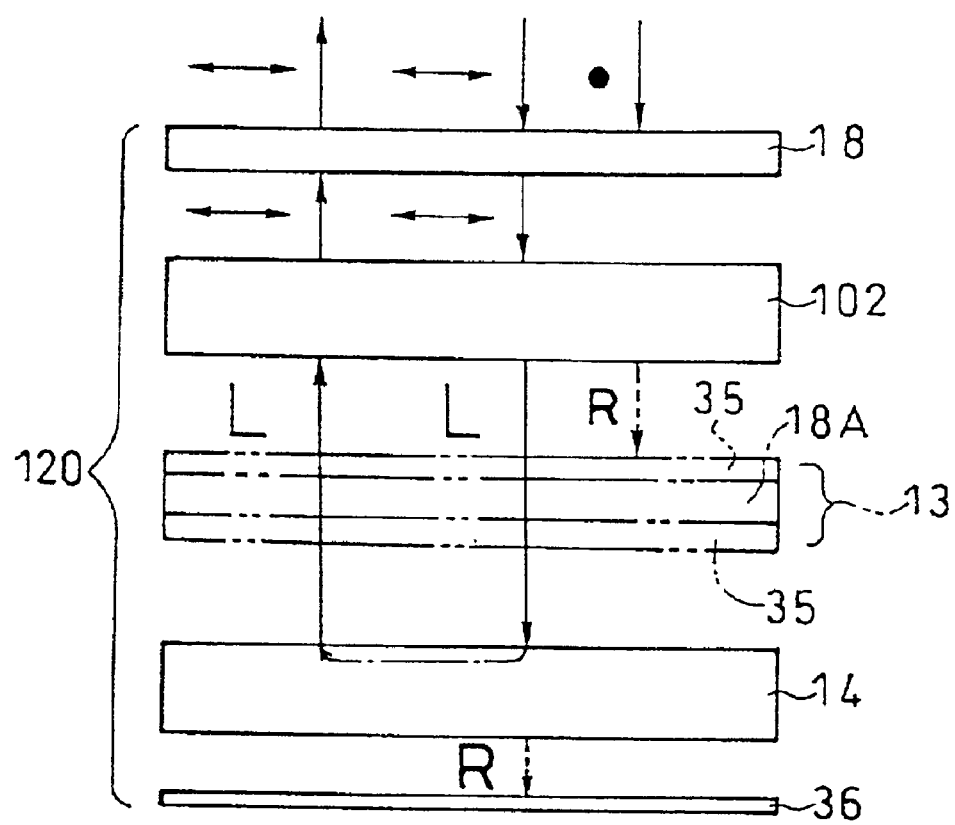
FIG. 26 is a simplified cross-section view showing an exploded view of the main parts of a liquid-crystal display according to an eleventh embodiment of the present invention.

A liquid-crystal display 120 according to an eleventh embodiment of the present invention, shown in FIG. 26, is described below.

The liquid-crystal display 120 shown in FIG. 26 is the liquid-crystal display 100 except that it is a reflective type, in which a light-absorbing layer 36 is provided in place of the light source 12 of FIG. 21.

Because other aspects and elements of the configuration are the same as the liquid-crystal display 100 shown in FIG. 21, corresponding elements have been assigned the same reference numerals, and are not explicitly described herein.

In the reflective type liquid-crystal display 120, external (unpolarized) light strikes the dichroic linear polarization layer 18, at which only horizontal linearly polarized light coinciding with the established transmission axis thereof is allowed to strike the liquid-crystal cell 10. The other linearly polarized light component of the external light is absorbed by the dichroic linear polarization layer 18, so that reflected light is not allowed to reduce the screen contrast.

The phase of horizontal linearly polarized light striking the liquid-crystal cell 102 is shifted by the electrical field applied to the liquid-crystal layer.

That is, by applying a voltage to the liquid-crystal layer 104 from the pixel electrodes 104A and 104B, the retardation value of the liquid crystal is changed, so that the phase of linearly polarized light passing through the liquid-crystal cell 102 is shifted by the applied electrical field substantially −π/2 to π/2.

As described above, when the phase of linearly polarized light striking the liquid-crystal cell 102 is shifted by π/2, it becomes linearly polarized light, and when it is shifted by −π/2 it becomes circularly polarized light of the opposite rotational direction, whereupon it exits from the liquid-crystal cell 102.

Of circularly polarized light exiting from the liquid-crystal cell 102 circularly polarized light of one rotational direction, for example a left-rotational circularly polarized light L as shown in FIG. 21, is transmitted through the circular polarization separation layer 14, so that it reaches the light-absorbing layer 36.

The other, right-rotational circularly polarized light R is reflected at the circular polarization separation layer 14, and strikes the liquid-crystal cell 102 without a change in its phase.

Because, as described above, a voltage is applied to the liquid-crystal layer 104 of the liquid-crystal cell 102 from the pixel electrodes 104A and 104B, the phase of circularly polarized light that passes through the liquid-crystal cell 102 is shifted substantially by −π/2 to π/2 by the action of the application of an electrical field.

Therefore, when the phase of circularly polarized light incident to the liquid-crystal cell 102 is shifted by π/2, it becomes linearly polarized light, and when it is shifted by −π/2, it becomes linearly polarized light of the opposite direction, whereupon it exits from the liquid-crystal cell 102.

Because the polarization transmission axis of the dichroic linear polarization layer 18 is caused to coincide with one of the polarization directions of the two directions as noted above, light is transmitted through the dichroic linear polarization layer 18 responsive to the inclination of the polarization axis of linearly polarized light exiting from the liquid-crystal cell 102, this light being used as the display light. Therefore, by controlling the electrical field applied to the liquid-crystal layer 104, it is possible to adjust the amount of light passing through the dichroic linear polarization layer 18, so that a liquid crystal display function can be achieved, in addition, of course, to gray-scale display.

It is also possible to have the shift the phase of light transmitted through the liquid-crystal cell by π/2 when no voltage is applied to the liquid-crystal cell from the pixel electrodes, and to substantially not shift the phase of light transmitted through the liquid-crystal cell with voltage applied to the electrodes.

In the liquid-crystal display 120 as well, it is possible to dispose the auxiliary circular polarization layer 13 between the circular polarization separation layer 14 and the liquid-crystal cell 102.

In this case, a left-rotational circularly polarized light L exiting from the liquid-crystal cell 102 is absorbed in the auxiliary dichroic circular polarization layer 13, so that a condition with very good contrast is achieved.

Figure 27:
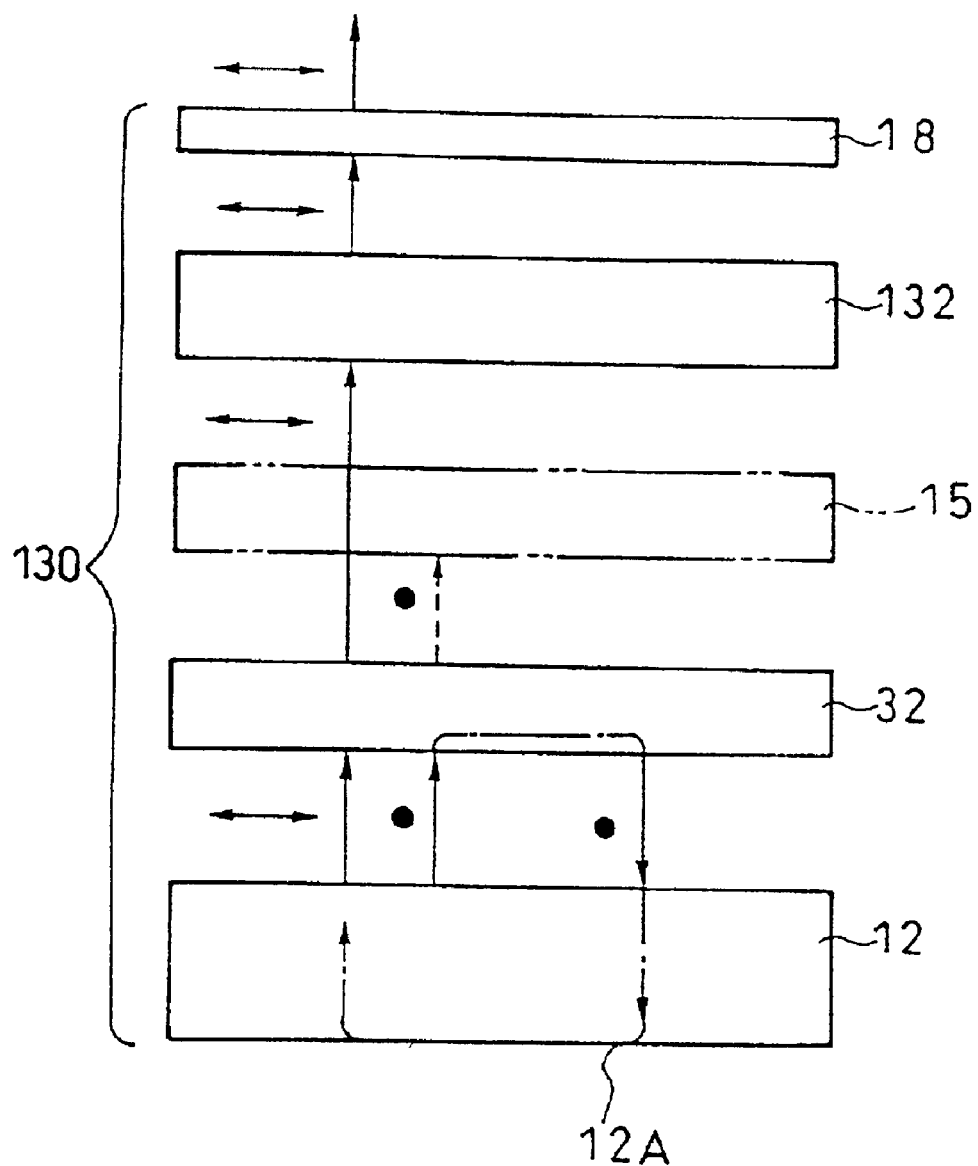
FIG. 27 is a simplified cross-section view showing an exploded view of the main parts of a liquid-crystal display according to a twelfth embodiment of the present invention.
Figure 28:
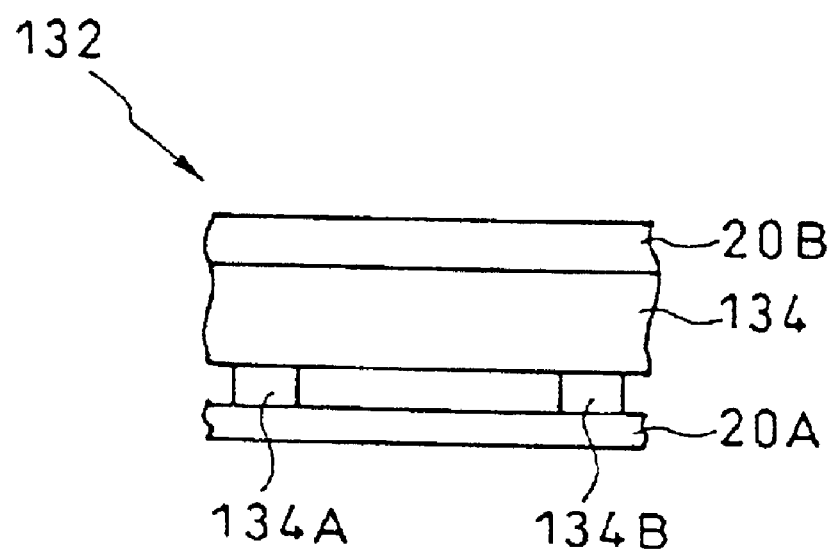
FIG. 28 is an enlarged cross-section view of a liquid-crystal cell in the above-noted liquid-crystal display.

A liquid-crystal display 130 according to the twelfth embodiment of the present invention, shown in FIG. 27, is described below. This liquid-crystal display 130 includes the light source 12, the linear polarization separation layer 32, a liquid-crystal layer 134 having a retardation value that shifts the phase of transmitted light substantially by π (refer to FIG. 28), and pixel electrodes 134A and 134B that apply an electrical field to this liquid-crystal layer 134. The liquid-crystal display 130 further has a liquid-crystal cell 132 whereby incident linearly polarized light that passes through a linear polarization separation layer 14 is converted before it exits from the other direction with respect to the linear polarization separation layer 32 to another linearly polarized light of a direction that is perpendicular to the above-noted linearly polarized light, by a change in the direction of the directors in the liquid crystal by application of an electrical field to the liquid-crystal layer 134 from the pixel electrodes 134A and 134B, and the light-absorption type dichroic linear polarization layer 18 disposed on the side of the liquid-crystal cell 132 opposite of the linear polarization separation layer 32, and which receives linearly polarized light that passes through the liquid-crystal cell 132.

Because the liquid-crystal cell 132, with the exception of the liquid-crystal layer 134, is same as the liquid-crystal cell 16 show in FIG. 4 to FIG. 6, other parts will not be described herein.

The liquid-crystal layer 134 is adjusted so as to have a retardation value that shifts the phase of transmitted light by substantially π, regardless of whether or not an electrical field is applied to the pixel electrodes 134A and 134B, the retardation value being substantially the same. This adjustment can be done by a known liquid crystal (for example, a nematic liquid crystal) by control of the birefringence and thickness of the liquid-crystal layer. The direction of the directors D is substantially parallel with respect to both the of the substrates 20A and 20B.

The above-noted expressions "(shifted) substantially π/2" and "substantially parallel to the substrates 20A and 20B" include the cases in which there is a slight shift from the ideal condition, because of a pre-tilt in the liquid crystal or various external disturbances.

If the above-noted shift is described in terms of the Poincare sphere of FIG. 2, for example, if horizontal linearly polarized light represented by a point H on the equator is shifted with a direction angle of λ=0 in the positive direction, it reaches to the point V on the equator of the Poincare sphere. That is, the horizontal linearly polarized light is shift by π so that it becomes vertical linearly polarized light.

As noted above, when the phase of horizontal linearly polarized light is shifted by π, this becomes vertical linearly polarized light-that is perpendicular to the horizontal linearly polarized light. Therefore, if linearly polarized light is caused to be incident at an angle of 45° with respect to the director direction of a liquid crystal having a retardation value that shifts the phase of light by π, the linearly polarized light that is perpendicular to the above-noted linearly polarized light results.

If the director direction within the liquid crystal is rotated with the plane without a change in the retardation value of the liquid crystal, the polarization condition changes from the condition of the one linearly polarized light to the other linearly polarized light having a direction perpendicular thereto. For example, if linearly polarized light is caused to be incident at an angle of 0° with respect to the direction of the liquid crystal, the polarization condition of the linearly polarized light ideally does not change, and if the linearly polarized light is caused to be incident at an angle of 0 to 45° with respect to the direction of the liquid crystal, the polarization condition of the linearly polarized light is an arbitrary condition up until linearly polarized light that is perpendicular to the above-noted linearly polarized light. The linearly polarized light is moved to an arbitrary point on the equator of the Poincare sphere of FIG. 2. That is, it is possible to change the direction of the electrical field vector of linearly polarized light incident to the liquid-crystal layer substantially in the range from 0 to 90°.

In a liquid-crystal display 130 as described above, of unpolarized light exiting from the light source 12 linearly polarized light of a particular direction, for example, a horizontal linearly polarized light is transmitted, with a component perpendicular thereto being reflected.

Because the reflected linearly polarized light component is reflected by the reflective layer 12A of the light source 12, in the case of a scattering sheet, for example, 50% of the light becomes horizontal linearly polarized light, which is transmitted through the linear polarization separation layer 32. This is true even in the case in which the light scattering sheet exists in the light path.

The linearly polarized light that has passed through the linear polarization separation layer 32 strikes the liquid-crystal cell 132, at which depending upon the direction of the directors of the liquid-crystal layer, the direction of the electrical field vector is substantially changed from 0 to 90°.

More specifically, according to the retardation in the liquid-crystal layer 134 of the liquid-crystal cell 132, the horizontal linearly polarized light becomes vertical linearly polarized light, and by applying a voltage to the liquid-crystal layer 22 from the pixel electrodes 134A and 134B, the director direction is changed without changing the retardation from substantially π, thereby changing the direction of the electrical field oscillation vector of the linearly polarized light passing through the liquid-crystal cell 132 by the action of the applied electrical field by substantially 0 to 90°.

In particular, it is preferable that a circuit 26 (referring to FIG. 4) be provided that controls the voltage between the electrodes so that the director direction of the liquid crystal is substantially changed by 0 to 45°.

If this is done, as described above, the phase of linearly polarized light incident to the liquid-crystal cell 132 exits from the liquid-crystal cell 132 in a polarization condition changed up to linearly polarized light perpendicular to the polarization of the incident light.

If the polarization transmission axis of the dichroic linear polarization layer 18 is caused to coincide with one of the two polarization directions, by controlling the electrical field applied to the liquid-crystal layer 134 so that the direction of the directors of the liquid crystal are changed substantially by 0 to 45°, it is possible, similar to the case of the liquid-crystal cell 16 of FIG. 4, to adjust the amount of light passing through the dichroic linear polarization layer 18 from the minimum to the maximum amount, thereby enabling achievement of a good display function, such as a gray-scale display function.

Figure 29:
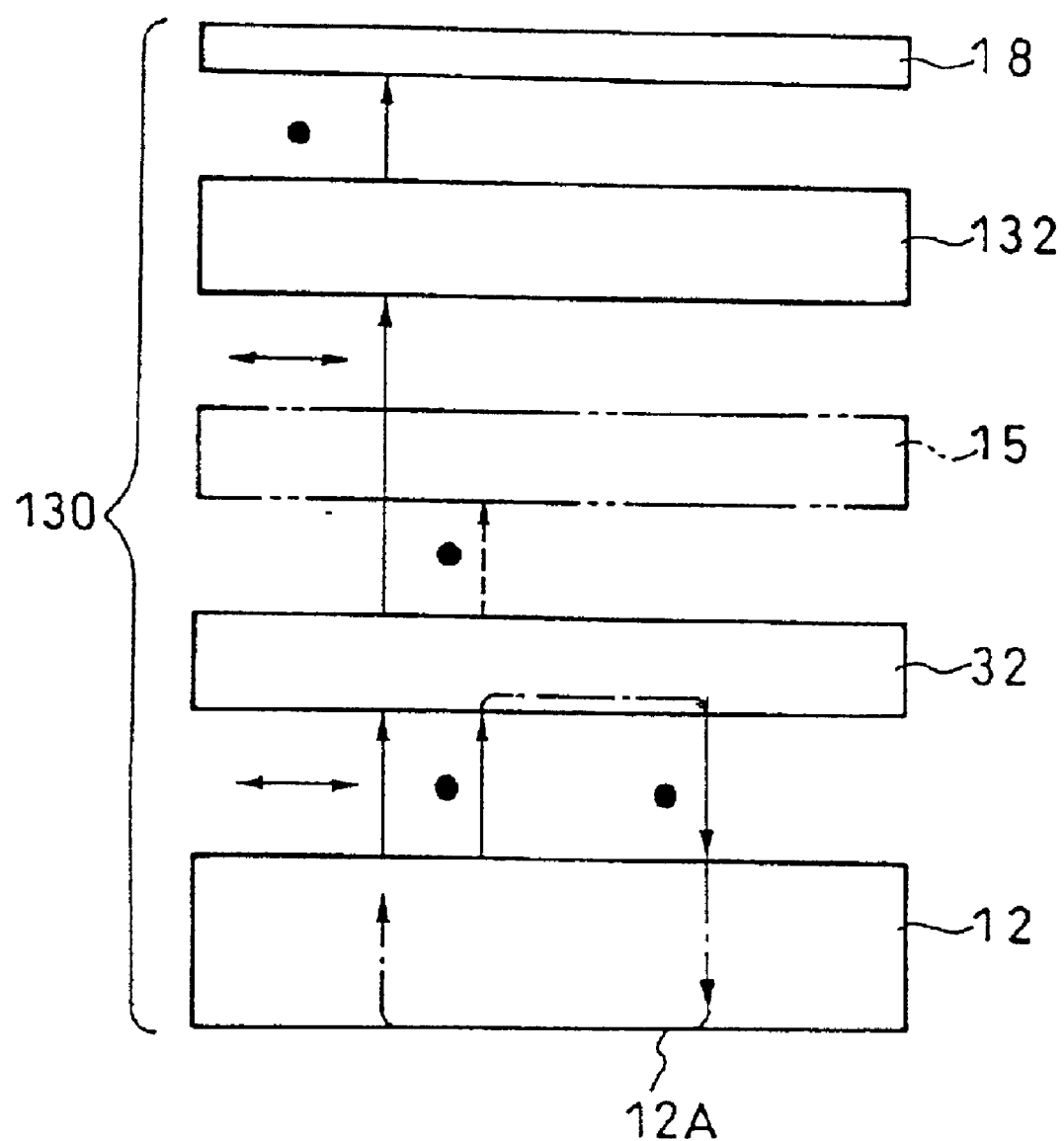
FIG. 29 is a cross-section view similar to FIG. 27, showing the dark display function of the above-noted liquid-crystal display.

FIG. 27 shows the so-called light display condition of linearly polarized light exiting from the dichroic linear polarization layer 18 and, as shown in FIG. 29, but if the direction of the directors D of the liquid crystal in the liquid-crystal cell 132 is changed so that the polarization direction of linearly polarized light exiting from the liquid-crystal cell 132 is perpendicular to the case of FIG. 27, the so-called dark display condition will results.

Because the dichroic linear polarization layer 18 is made of a light-absorption type dichroic polarizer, even if external (unpolarized) light strikes the surface of the dichroic linear polarization layer 18, 50% thereof is absorbed, and the remaining 50% is transmitted, so that there is almost no reflected component, therefore enabling a great suppression of a reduction in screen contrast in the liquid-crystal display 130.

In this liquid-crystal display 130 as well, it is possible to dispose the auxiliary linear polarization layer 15 between the linear polarization separation layer 32 and the liquid-crystal cell 132.

In this case, linearly polarized light that has passed through the linear polarization separation layer 32 is transmitted through the auxiliary dichroic linear polarization layer 15, while the remaining linearly polarized light that is not reflected by the linear polarization separation layer 32 is absorbed. Therefore, a condition is achieved in which there is excellent contrast.

Figure 30:
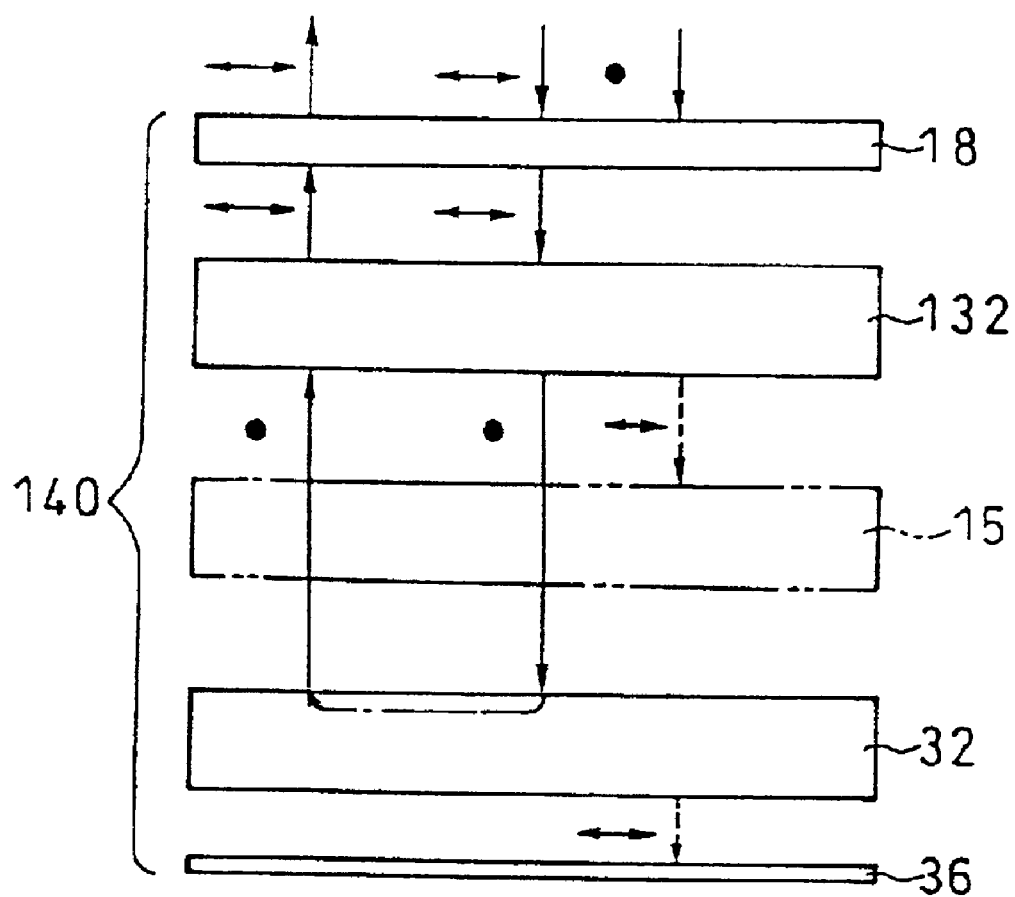
FIG. 30 is a simplified cross-section view showing an exploded view of the main part of a liquid-crystal display according to a thirteenth embodiment of the present invention.
Figure 31:
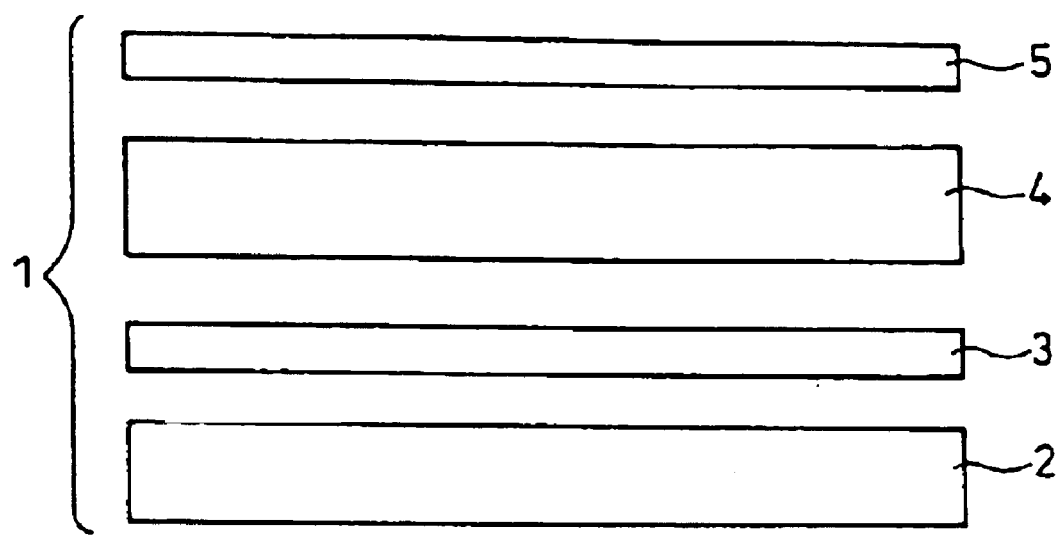
FIG. 31 is a cross-section view similar to FIG. 1, showing a liquid-crystal display of the past.

A liquid-crystal display 140 according to the thirteenth embodiment of the present invention, shown in FIG. 30, is described below.

In FIG. 30, elements corresponding to those in the liquid-crystal display 130 of FIG. 27 are assigned the same reference numerals, and are not explicitly described herein.

The liquid-crystal display 140 shown in FIG. 30 is the liquid-crystal display 130 except that it is a reflective type, in which the light-absorbing layer 36 is provided in place of the light source 12 of FIG. 27.

Because other aspects and elements of the configuration are the same as the liquid-crystal display 130 shown in FIG. 27, corresponding elements have been assigned the same reference numerals, and are not explicitly described herein.

In the reflective type liquid-crystal display 120, external (unpolarized) light strikes the dichroic linear polarization layer 18, at which only horizontal linearly polarized light coinciding with the established transmission axis thereof is allowed to strike the liquid-crystal cell 132. The other linearly polarized light component of the external light is absorbed by the dichroic linear polarization layer 18, so that reflected light is not allowed to reduce the screen contrast.

The direction of the electrical field oscillation vector of horizontal linearly polarized light striking the liquid-crystal cell 132 is substantially shifted by 0 to 90°, by the existence of the liquid-crystal layer 134.

While the retardation value of the liquid crystal in the liquid-crystal cell 132 tends to cause the horizontal linearly polarized light tends to shift so as to become vertical linearly polarized light, by applying a voltage to the liquid-crystal layer 134 from the pixel electrodes 134A and 134B, the directors rotate within the plane, without a change of the liquid crystal retardation value from $\pi$, the result being that, in accordance with the angle formed between the direction of the electrical field vector of the linearly polarized light and the phase-lag axis or phase-lead axis of the liquid-crystal layer, there is a change from the linearly polarized light to some arbitrary linearly polarized light condition, up to the condition of linearly polarized light perpendicular to the original linearly polarized light.

Therefore, linearly polarized light exiting from the liquid-crystal cell 132, depending upon the direction of this polarization axis, is reflected at the linear polarization separation layer 32, the remaining component being transmitted through the linear polarization separation layer 32. Linearly polarized light reflected from the linear polarization separation layer 14 is returned to the liquid-crystal cell 132 and exits from the dichroic linear polarization layer 18 as display light.

The amount of light reflected from the linearly polarized light linear polarization separation layer 32 and passing through the liquid-crystal cell 132 can be adjusted by a voltage applied to the liquid-crystal layer 34. By doing this, it is possible to obtain a gray-scale display.

Polarized light having passed through the linear polarization separation layer 32 is absorbed by the black light-absorbing layer 36, thereby removing this light, so that there is excellent contrast compared to the polarized light (display light) reflected from the linear polarization separation layer 3 and passing through the liquid-crystal cell 132.

In the liquid-crystal display 140 as well, it is possible to dispose the auxiliary dichroic linear polarization layer 15 between the linear polarization separation layer 32 and the liquid-crystal cell 132.

In this case, part of the linearly polarized light exiting from the liquid-crystal cell 132 is transmitted through the auxiliary dichroic linear polarization layer 15, the remaining light being absorbed by the auxiliary linear polarization layer 15. Therefore, it is possible to achieve a condition with excellent contrast.

The liquid-crystal display 10 shown in FIG. 1 is formed by lamination of a circular polarization separation layer 14 formed by a planar oriented cholesteric liquid-crystal layer, a liquid-crystal cell 16 having a retardation value so as to shift the phase of light by substantially $\pi/2$, and a light-absorption type dichroic linear polarization layer 18.

By applying an electrical field to the liquid-crystal cell 16 and changing the directors of the liquid-crystal layer 22 while holding the retardation value of the liquid crystal constant, it was possible to improve the efficiency of light utilization, without a great reduction in contrast caused by external light.

The liquid-crystal display 30 shown in FIG. 8 was made by lamination of a linear polarization separation layer 32 made of an extended multilayer structure, a liquid-crystal cell having a retardation value so as to shift the phase of light substantially by $\pi/2$, and a dichroic circular polarization layer 34 made of a light-absorption type dichroic linear polarization layer with a $\lambda/4$ phase-shifting layer, this resulting in an improvement in the efficiency of light utilization, without a great reduction in contrast caused by external light.

The reflective type liquid-crystal display 40 shown in FIG. 10 was formed by laminating a cholesteric liquid-crystal layer as a circular polarization separation layer 14, a black light-absorbing layer 36, a liquid-crystal cell having a retardation value so as to shift the phase of light substantially by $\pi/2$, and a light-absorption type dichroic linear polarization layer 18. In this case as well, there was no great reduction in contrast caused by external light. A polarized light component transmitted through the liquid-crystal cell that is not completed changed to circularly polarized light is absorbed by the auxiliary dichroic linear polarization layer 13 and black light-absorbing layer 36, thereby removing this light, so that a display condition is achieved having excellent contrast.

In the reflective type liquid-crystal display 50 shown in FIG. 12, the effect achieved is the same, and it was possible to achieve a dark display condition with excellent contrast.

The liquid-crystal display 60 shown in FIG. 14 was fabricated by laminating a cholesteric liquid-crystal layer as the circular polarization separation layer 14, a liquid-crystal cell 62 having a retardation value varied by an applied voltage so that the phase of light is substantially shifted by 0 to $\pi$, and a light-absorption type dichroic linear polarization layer with a $\lambda/4$ phase-shifting layer as the dichroic circular polarization layer 34.

With an electrical field applied to the liquid-crystal cell 62, so as to vary the retardation value of the liquid crystal, it was possible to improve the efficiency of light utilization, without a great reduction in contrast caused by external light.

The liquid-crystal display 70 shown in FIG. 17 was fabricated by lamination of an extended multilayer structure as the linear polarization separation layer 32, a liquid-crystal cell 62 similar to that noted above, and a light-absorption type dichroic linear polarization layer 18, and, similar to the above-noted case, it was possible to improve the efficiency of light utilization, without a great reduction in contrast caused by external light.

The reflective type liquid-crystal display 80 shown in FIG. 19 was fabricated by lamination of a cholesteric liquid-crystal layer as the circular polarization separation layer 14, a black light-absorbing layer 36, a liquid-crystal cell 62 the same as noted above, and a light-absorption type dichroic circular polarization layer 34. In this case, there was no great reduction in contrast caused by external light.

Additionally, the linearly polarized light component transmitted through the liquid-crystal cell was absorbed the black light-absorbing layer 36, and thereby removed, so that a display condition with excellent contrast was achieved.

In the reflective type liquid-crystal display 90 shown in FIG. 20, the effect achieved is the same, and it was possible to achieve a display condition with excellent contrast.

The liquid-crystal display 100 shown in FIG. 100 was fabricated by lamination of a cholesteric liquid-crystal layer as the circular polarization separation layer 14, a liquid-crystal cell 102 having a retardation value varied by an applied voltage so that the phase of light is substantially shifted by $-\pi/2$ to $\pi/2$, and a dichroic linear polarization layer 18.

With an electrical field applied to the liquid-crystal cell 102, so as to vary the retardation value of the liquid crystal, it was possible to improve the efficiency of light utilization, without a great reduction in contrast caused by external light. In the reflective type liquid-crystal display 120 shown in FIG. 26, the effect achieved is the same to the above-described.

The liquid-crystal display 110 shown in FIG. 24 was fabricated by lamination of an extended multilayer structure as the linear polarization separation layer 32, a liquid-crystal cell 102 similar to that noted above, and a light-absorption type dichroic linear polarization layer 34, and, similar to the above-noted case, it was possible to improve the efficiency of light utilization, without a great reduction in contrast caused by external light.

The liquid-crystal display 130 shown in FIG. 27 was fabricated by lamination of an extended multilayer structure as the linear polarization separation layer 32, a liquid-crystal cell 132 having a retardation value varied by an applied voltage so that the director of the liquid crystal is varied, thereby changing the direction of the electrical field oscillation vector of incident linearly polarized light, and a dichroic linear polarization layer 18.

With an electrical field applied to the liquid-crystal cell 132, so that the directors of the liquid crystal change, it was possible to improve the efficiency of light utilization, without a great reduction in contrast because of external light.

The reflective type liquid-crystal display 140 shown in FIG. 30 was fabricated by lamination of an extended multilayer structure as the linear polarization separation layer 32, a black light-absorbing layer 36, a liquid-crystal cell 132 similar to that noted above, an auxiliary dichroic linear polarization layer 15, and a light-absorption type dichroic linear polarization layer 18.

In this case as well, there was no great reduction in the contrast because of external light. Additionally, a polarized light component passing through the liquid crystal is absorbed by the black light-absorbing layer 36, being thereby removed, so that a display condition with excellent contrast is achieved.

INDUSTRIAL APPLICABILITY

A liquid-crystal display according to the present invention achieves a great improvement in the efficiency of light utilization, and, by making use of the birefringence of a liquid-crystal layer, enables the achievement of a display condition with excellent contrast, without a great reduction in contrast caused by external light.

What is claimed is:

1. A liquid-crystal display comprising:
   a dichroic circular polarizing layer which, of incident light transmits a circularly polarized light component of one direction, either right or left, and absorbs a circularly polarized light component of the other direction;
   a liquid crystal cell, including a liquid crystal layer that shifts the phase of light passing therethrough, and electrodes for applying an electric field to said liquid crystal layer, said liquid-crystal cell having the effect of shifting a circularly polarized light phase of incident light substantially by 0 to $\pi$, when said electrical field is applied to said liquid-crystal layer from said electrodes so as to change the retardation value thereof; and
   a polarization separation layer being made a circular polarization separation layer that, of the incident light thereto, transmits a light component of one circular polarization, either right or left, and reflects another circularly polarized light component having the opposite polarization.

2. A liquid-crystal display according to claim 1, wherein said liquid-crystal cell is held between two substrates, the electrodes being disposed on said two substrates, with said liquid crystal therebetween, wherein when voltage is applied to said electrodes, a mode is enabled in which angle of liquid crystal molecules with respect to said substrate surfaces changes, thereby changing the retardation value of said liquid crystal.

3. A liquid-crystal display according to claim 1, wherein said circular polarization separation layer is made of a rotation-selective layer made of a cholesteric liquid crystal.

4. A liquid-crystal display according to claim 1, wherein said circular polarization separation layer is made of a laminate of a phase-shifting layer having a retardation value that shifts the phase of a transmitted light by substantially $\pi/2$ and three or more films having birefringence, this being a planar multilayer structure wherein of two lights having oscillation directions mutual perpendicular within the plane of each layer, the difference in index of refraction between layers adjacent in the thickness direction with respect to one light is different from the difference in the index of refraction between adjacent layers in the thickness direction for the other light, linearly polarized light transmitted through or reflected by this planar multilayer structure being converted to circularly polarized light.

5. A liquid-crystal display according to claim 1, further comprising an auxiliary dichroic circular polarizing layer between said liquid-crystal cell and said circular polarization separation layer, whereby, of the incident light, one circularly polarized light component of either right or left rotation is transmitted, and another circularly polarized light component of the opposite direction is absorbed.

* * * * *